US009411058B2

(12) United States Patent
Penumadu

(10) Patent No.: US 9,411,058 B2
(45) Date of Patent: Aug. 9, 2016

(54) POLYMER COMPOSITE BASED THERMAL NEUTRON DETECTORS

(71) Applicant: University of Tennessee Research Foundation, Knoxville, TN (US)

(72) Inventor: Dayakar Penumadu, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 14/310,662

(22) Filed: Jun. 20, 2014

(65) Prior Publication Data

US 2015/0247938 A1    Sep. 3, 2015

Related U.S. Application Data

(63) Continuation-in-part of application No. 13/828,855, filed on Mar. 14, 2013, now Pat. No. 8,796,631.

(60) Provisional application No. 61/624,009, filed on Apr. 13, 2012.

(51) Int. Cl.
*G01T 1/10* (2006.01)
*G01T 3/06* (2006.01)

(52) U.S. Cl.
CPC ........................................ *G01T 3/06* (2013.01)

(58) Field of Classification Search
CPC ........................................................ G01T 1/203
USPC ........................................................ 250/362
See application file for complete search history.

(56) References Cited

U.S. PATENT DOCUMENTS

| 3,573,220 | A | * | 3/1971 | Benson ........................ 250/362 |
| 3,930,098 | A | | 12/1975 | Araki et al. |
| 4,798,685 | A | * | 1/1989 | Yaniger ................... H01B 1/128 252/500 |
| 4,884,288 | A | * | 11/1989 | Sowerby ........................ 378/51 |
| 4,910,149 | A | | 3/1990 | Okube et al. |
| 5,606,638 | A | * | 2/1997 | Tymianski et al. ........... 385/143 |
| 5,880,471 | A | * | 3/1999 | Schelten et al. ........ 250/370.05 |
| 6,007,665 | A | | 12/1999 | Bourdelais et al. |
| 6,174,657 | B1 | * | 1/2001 | Weidner et al. ............... 430/510 |
| 7,804,072 | B2 | * | 9/2010 | Czirr ....................... 250/390.11 |
| 7,857,993 | B2 | | 12/2010 | Dai et al. |
| 7,985,868 | B1 | | 7/2011 | Bauer et al. |
| 8,440,980 | B2 | | 5/2013 | Shah et al. |
| 8,735,843 | B2 | | 5/2014 | Payne et al. |
| 8,796,631 | B2 | | 8/2014 | Penumadu et al. |
| 2005/0064154 | A1 | * | 3/2005 | Aylward et al. ............. 428/195.1 |

(Continued)

OTHER PUBLICATIONS

Argyrakis, P., and Kopelman, R., "Correlated Hopping Model for Singlet Exciton Transport in Lightly Doped Naphthalene Crystals," Chemical Physics. vol. 51 pp. 9-16 (1980).

(Continued)

*Primary Examiner* — Kiho Kim
(74) *Attorney, Agent, or Firm* — Jenkins, Wilson, Taylor & Hunt, P.A.

(57) ABSTRACT

Polymer composite neutron detector materials are described. The composite materials include an aromatic polymer matrix, such as an aromatic polyester. Distributed within the polymer matrix are neutron capture agents, such as $^6$LiF nanoparticles, and organic or inorganic luminescent fluors. The composite materials can be formed into stretched or unstretched thin films, fibers or fiber mats.

27 Claims, 12 Drawing Sheets
(12 of 12 Drawing Sheet(s) Filed in Color)

(56) References Cited

U.S. PATENT DOCUMENTS

| | | | |
|---|---|---|---|
| 2006/0142455 A1* | 6/2006 | Agarwal et al. | 524/423 |
| 2008/0128628 A1 | 6/2008 | Moses et al. | |
| 2008/0280141 A1 | 11/2008 | Dobbs et al. | |
| 2009/0236530 A1 | 9/2009 | Bell et al. | |
| 2010/0224783 A1 | 9/2010 | Frank | |
| 2012/0097898 A1* | 4/2012 | Seshadri et al. | 252/500 |
| 2012/0219113 A1* | 8/2012 | Beck | 378/44 |
| 2013/0181137 A1 | 7/2013 | Watanabe et al. | |
| 2013/0270442 A1 | 10/2013 | Penumadu et al. | |
| 2014/0124677 A1 | 5/2014 | Zaitseva et al. | |

OTHER PUBLICATIONS

Cheung et al., "Synthesis, Photodegradation, and Energy Transfer in a Series of Poly (ethylene Terephthalate-co-2,6-Naphthalenedicarboxylate) Copolymers," Journal of Applied Polymer Science. vol. 24, No. 8 pp. 1809-1830 (1979).

Davenas et al., "Role of the structure on the photo and cathodoluminescence of poly(ethylene naphthalate): PEN," Synthetic Metals. vol. 115 pp. 83-87 (2000).

D'Olympia et al., "Pulse-shape Analysis of CLYC for Thermal Neutrons, Fast Neutrons, and Gamma Rays," Nuclear Instruments and Methods in Physics Research A vol. 714 pp. 121-127 (2013).

Nagata et al., "Radiation-induced luminescence of PET and PEN films under MeV ion and pulsed UV laser irradiation," Nuclear Instruments and Methods in Physics Research B. vol. 268 pp. 3099-3102 (2010).

Nakamura et al., "Evidence of deep-blue photon emission at high efficiency by common plastic," EPL. vol. 95 p. 22001 (2011).

Notice of Allowance corresponding to U.S. Appl. No. 13/828,855 dated Mar. 20, 2014.

Official Action corresponding to U.S. Appl. No. 13/828,855 dated Nov. 20, 2013.

Sen et al., "Polyester Composite Thermal Neutron Scintillation Films," IEEE Transactions on Nuclear Science. vol. 59, No. 4 pp. 1781-1786 (2012).

Sen et al., "Thermal Neutron Scintillator Detectors Based on Poly (2-Vinylnaphthalene) Composite Films," IEEE Transactions on Nuclear Science. vol. 58, No. 3 pp. 1386-1393 (2011).

Uppal et al., "$^6$Li Embedded PEN Scintillation Films and Fibers for Thermal Neutron Detection," 5th Annual Academic Research Initiative (ARI) Grantees Conference, Jul. 23 through Jul. 25, 2012, The National Conference Center, 18960 Upper Belmont Place, Lansdowne, Virginia [Abstract].

Uppal et al., "Composite Polyethylene Naphthalate Films/Fibers for Thermal Neutron Detection," 5th Annual Academic Research Initiative (ARI) Grantees Conference, Leesburg, VA, Jul. 23-25, 2012 (8 pages).

Young et al., "Investigation of 6Li Enriched Particle Dispersion in Fluorescent Electrospun Polymer Nanofibers to be Used as Thermal Neutron Scintillators," Journal of Engineering Materials and Technology. vol. 134 pp. 010908-1-010908-7 (2012).

\* cited by examiner

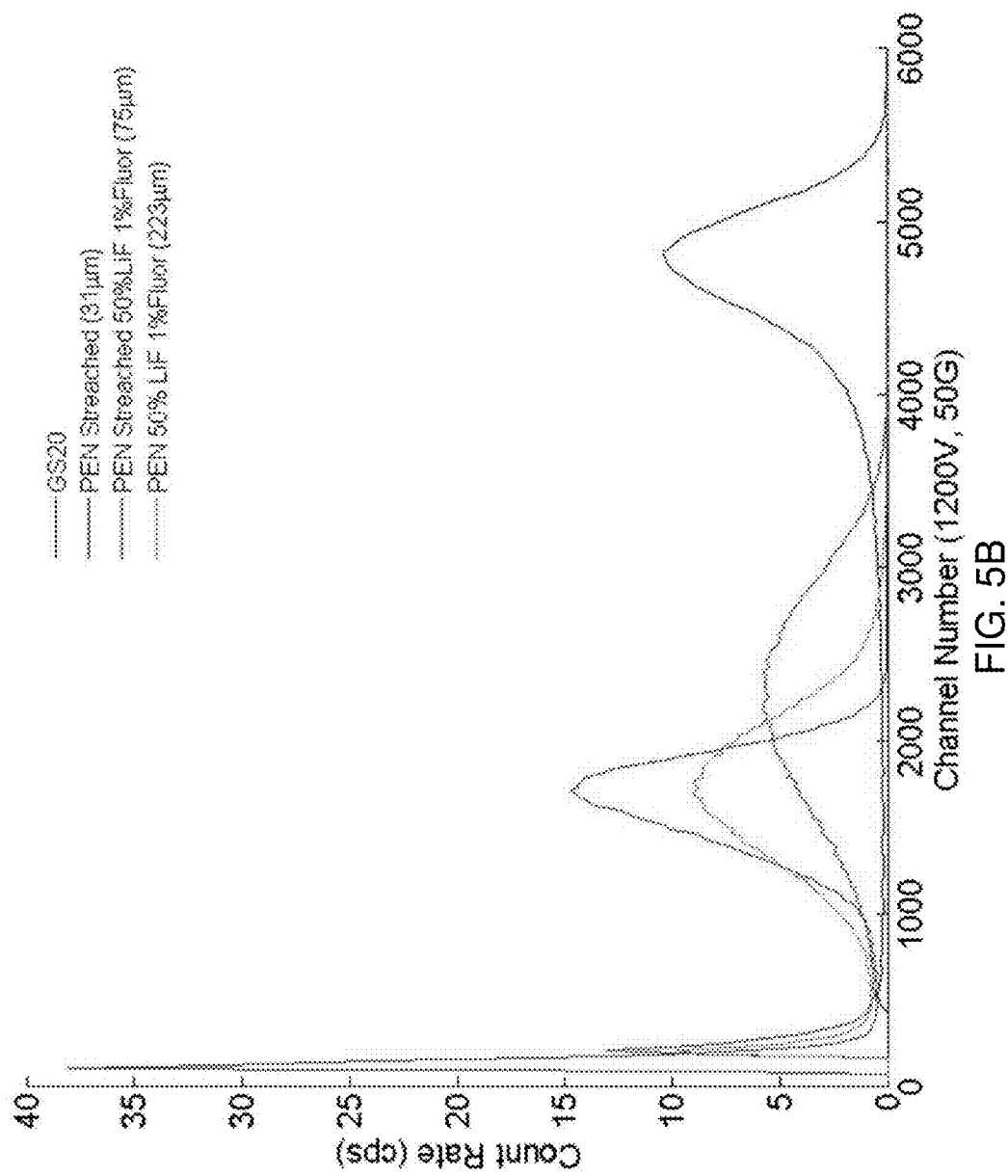

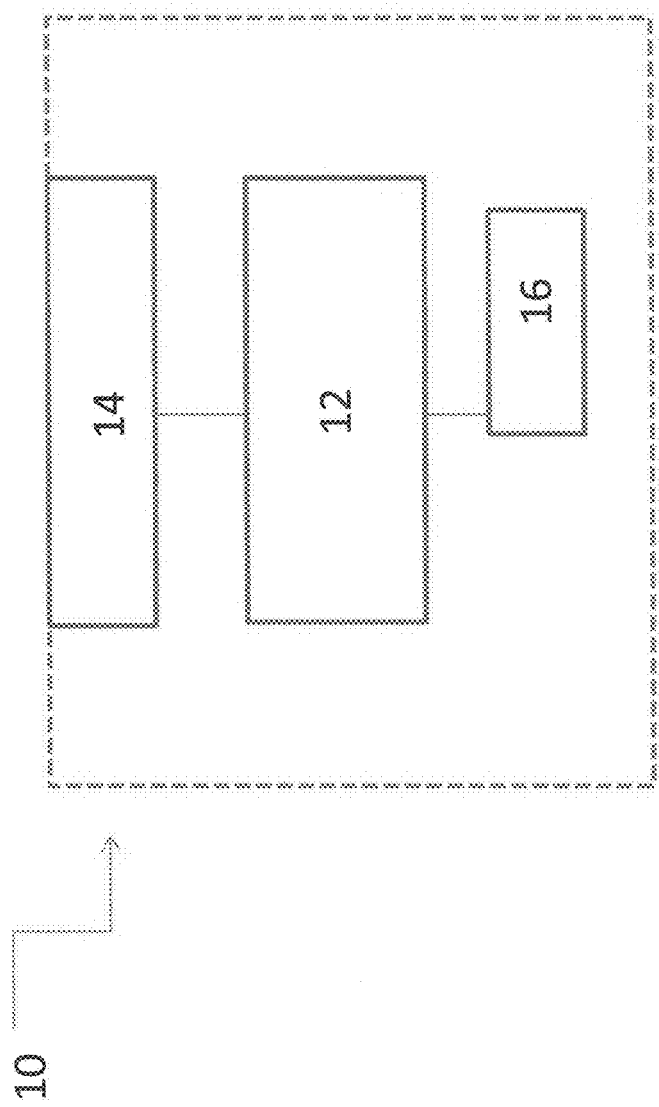

POLYMER COMPOSITE BASED THERMAL NEUTRON DETECTORS

RELATED APPLICATIONS

This application is a Continuation-in-Part of U.S. patent application Ser. No. 13/828,855, filed Mar. 14, 2013, herein incorporated by reference in its entirety, which is based on and claims priority to U.S. Provisional Patent Application Ser. No. 61/624,009, filed Apr. 13, 2012; the disclosure of which is incorporated herein by reference in its entirety.

GOVERNMENT INTEREST

This invention was made with government support under Grant No. 2009-DN-077-ARI031 awarded by the Domestic Nuclear Detection Office of the United States Department of Homeland Security and the National Science Foundation. The government has certain rights in the invention.

TECHNICAL FIELD

The presently disclosed subject matter relates to composite materials comprising a neutron capture agent, an aromatic polymeric matrix material, and an organic or inorganic luminescent fluor. The composite materials can be used for thermal neutron detection. In some embodiments, the composite materials can be formed into nanofibers or thin films.

ABBREVIATIONS

μm=micron
%=percentage
° C.=degrees Celsius
AIBN=azobisisobutyronitrile
AVP=aryl vinyl polymer
cc=cubic centimeter
CCD=charge-coupled device
cps=counts per second
DCM=dichloromethane
eq=equivalents
g=grams
HCl=hydrochloric acid
He=helium
Li=lithium
LiF=lithium fluoride
LLD=lower level discriminator
MeV=mega electron volt
mL=milliliter
mmol=millimole
$M_n$=number average molecular weight
nm=nanometer
PEN=polyethylene naphthalate
PHP=proton harvesting polymer
PMT=photomultiplier tube
POPOP=1,4-bis-(5-phenyloxazol-2-yl)
PPO=2,5-diphenyloxazole
PS=polystyrene
PSD=pulse shape discrimination
PTN=polytrimethylene naphthalate
P2VN=poly(2-vinylnaphthalene)
PVT=polyvinyl toluene
Sal=salicylate
SEM=scanning electron microscope
THF=tetrahydrofuran
TND=thermal neutron detector
UV=ultraviolet

BACKGROUND

Scintillators are materials that can emit light upon absorbing radiation or energy from ionizing radiation. The research, defense, and industrial communities use scintillators as radiation detectors in a variety of applications, such as, but not limited to, imaging, nuclear power generation, detection of special nuclear materials, and homeland security.

Detectors for the detection of neutrons in the presence of photons can use many different methods to discriminate signals that originate from either neutrons or photons. As an example, use of $^3$He in a pressurized tube for neutron detection permits discrimination of neutrons from photons by pulse amplitude. These detectors fail to correctly discriminate neutrons from photons only about one per 50,000 events. There are a few other scintillation materials that have slightly different light output characteristics when the energy is deposited by a photon or by a charged particle. This permits pulse shape discrimination (PSD) with sophisticated electronics. Another approach is to employ detectors with a very small probability of interaction for photons and a relatively high probability of interaction for neutrons. Some detectors of this type can achieve essentially 100% discrimination if charged particles are directly detected.

There is an ongoing need in the research, defense and industrial communities for scintillators that demonstrate improved capabilities in terms of light output, detection efficiency, high count rate capability, better time resolution of events, and, for neutron scintillators, fewer false counts due to gamma radiation. Especially in view of the imminent shortage of $^3$He, there is a need for an inexpensive replacement technology for thermal neutron detection, particularly for replacement technologies that provide easy to make detectors that can have various geometries and/or sizes.

SUMMARY

In some embodiments, the presently disclosed subject matter provides a polymer composite comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, optionally wherein the neutron capture agent comprises a $^6$Li compound; and an organic or inorganic luminescent fluor distributed within the matrix material.

In some embodiments, the matrix material comprises a polymer, copolymer or blend thereof comprising an aromatic moiety having a higher quantum yield than the quantum yield of phenyl. In some embodiments, the matrix material comprises at least one aromatic moiety selected from the group comprising naphthylene, anthracene, fluorene, terphenyl, phenanthrene, pyridine, furan, and thiophene.

In some embodiments, the matrix material comprises a polymer or copolymer selected from the group comprising a polyester, a polyamide, a polyether, a polyimide, a polythioester, a polyarylvinyl, a vinylpolyether, a vinylpolyester, a vinylpolyamide, and a vinylpolythioester. In some embodiments, the matrix material comprises a polyester. In some embodiments, the polyester is selected from the group comprising polyethylene naphthalate (PEN), polytrimethylene naphthalate (PTN), poly(9H-fluorene-9,9-dimethanol malonate), poly(9H-fluorene-9,9-dimethanol terephthalate), and poly(4,4'-(9-fluorenylidene)-diphenol terephthalate).

In some embodiments, the matrix material comprises a derivatized polyacrylic or polyalkylacrylic acid, wherein acid groups of the polyacrylic or polyalkylacrylic acid are derivatized to form ester, thioester or amide linked side chains, wherein the side chains comprise aromatic groups.

In some embodiments, the neutron capture agent is non-hygroscopic. In some embodiments, the neutron capture agent comprises $^6$LiF micro- or nanoparticles. In some embodiments, the micro- or nanoparticles are 3.2 microns or smaller. In some embodiments, the nanoparticles are about 200 nm or smaller, and/or in some embodiments, about 100 nm or smaller.

In some embodiments, the organic or inorganic luminescent fluor is selected based on acceptor donor resonance and/or is selected from the group comprising 2,5-diphenyloxazole (PPO), 1,4-bis-(5-phenyloxazol-2-yl) (POPOP), anthracene, 9,9,9',9',9",9"-hexakis(octyl)-2,7',2',7"-trifluorene, n-terphenyl, 2-biphenyl-5-phenyl-1,3-oxazole, 2-biphenyl-5(α-naphthyl)-1,3-oxazole, 2-phenyl-5-(4-biphenylyl)-1,3,4-oxadiazole, 2-(4'-tert-butylphenyl)-5-(4"-biphenylyl)-1,3,4-oxadiazole, n-bis-(o-methylstyryl)-benzene 1,4-di-(5-phenyl-2-oxazolyl)-benzene, conjugated polymeric and oligomeric dyes, metal organic framework dyes, quantum dots and two-photon absorber semiconductor fluors.

In some embodiments, the composite has a ratio of matrix material to neutron capture agent of between about 3:1 by weight and about 1:2 by weight. In some embodiments, the composite comprises about 5% or less by weight of the organic or inorganic luminescent fluor. In some embodiments, the composite comprises $^6$Li salicylate or $^6$LiF as a neutron capture agent and poly(2-vinylnaphthalene) (P2VN) as a matrix material. In some embodiments, the composite comprises $^6$LiF as a neutron capture agent and PEN as a matrix material.

In some embodiments, the presently disclosed subject matter provides a film comprising a polymer composite comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material.

In some embodiments, the film has a thickness of about 500 microns or less. In some embodiments, the film has a thickness of about 220 microns or less. In some embodiments, the film has a thickness of about 50 microns or less. In some embodiments, the film is a biaxially or uniaxially stretched film. In some embodiments, the film is thermally annealed. In some embodiments, the thermal annealing is performed at a temperature between about 150° C. and about 180° C.

In some embodiments, the matrix material comprises a polymer or copolymer selected from the group comprising a polyester, a polyamide, a polyether, a polyimide, a polythioester, a vinylpolyether, a vinylpolyester, a vinylpolyamide, and a vinylpolythioester. In some embodiments, the matrix material is a polyester. In some embodiments, the polyester is selected from the group comprising polyethylene naphthalate (PEN), polytrimethylene naphthalate (PTN), poly(9H-fluorene-9,9-dimethanol malonate), poly(9H-fluorene-9,9-dimethanol terephthalate), and poly(4,4'-(9-fluorenylidene)-diphenol terephthalate).

In some embodiments, the neutron capture agent is non-hygroscopic. In some embodiments, the neutron capture agent comprises $^6$LiF micro- or nanoparticles. In some embodiments, the matrix material comprises PEN, the neutron capture agent comprises $^6$LiF micro- or nanoparticles and the film is a stretched and/or thermally annealed film.

In some embodiments, the film comprises a polymer composite having a ratio of matrix material to neutron capture agent of between about 3:1 and about 1:5 by weight. In some embodiments, the film comprises a polymer composite comprising about 49.5% by weight PEN, about 49.5% by weight $^6$LiF, and about 1% by weight 9,9,9',9',9",9"-hexakis (octyl)-2,7',2',7"-trifluorene. In some embodiments, the film comprises a polymer composite comprising about 70% by weight PEN, about 25% by weight $^6$LiF, and about 5% by weight PPO/POPOP.

In some embodiments, the film has a neutron count rate per mg of $^6$Li of between about 4 and about 12 counts per second (cps).

In some embodiments, the film is prepared by: providing a mixture of the matrix material, a neutron capture agent, and a luminescent fluor; and hot pressing or extruding the mixture to form the film. In some embodiments, providing the mixture comprises preparing micro- or nanoparticles of $^6$LiF; and mixing the micro- or nanoparticles with the matrix material and the luminescent fluor.

In some embodiments, the presently disclosed subject matter provides an apparatus for detecting neutron radiation, wherein the apparatus comprises a photon detector and a polymer composite comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material. In some embodiments, the polymer composite is in the form of a film having a thickness of about 500 microns or less.

In some embodiments, the presently disclosed subject matter provides a method for detecting neutron radiation, wherein the method comprises: providing a polymer composite comprising a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material; disposing the polymer composite in the path of a beam of radiation, wherein the matrix and the luminescent fluor of the polymer composite emits light when the composite absorbs said radiation; and detecting neutron radiation by detecting the light emitted by the composite, wherein the detecting discriminates between neutron and gamma radiation.

In some embodiments, providing a polymer composite of the presently disclosed subject matter comprises providing a film of the polymer composite. In some embodiments, providing the film comprises providing a biaxially or uniaxially stretched and/or thermally annealed film.

In some embodiments, the presently disclosed subject matter provides a method of making a film or molded coupon comprising a polymer composite comprising a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material, wherein the method comprises: providing micro- or nanoparticles of the neutron capture agent; mixing the micro- or nanoparticles with the matrix material and the luminescent fluor to form a mixture; and pressing and heating the mixture to form the film or molded coupon.

In some embodiments, the matrix material is powdered prior to mixing with the micro- or nanoparticles and the luminescent fluor. In some embodiments, the mixture is ground into a powder and the powder is sieved and/or blended to obtain a homogenous mixture. In some embodiments, the mixture is sieved through a 500 µm or smaller sieve.

In some embodiments, the neutron capture agent is $^6$LiF micro- or nanoparticles that are 3.2 microns or smaller. In some embodiments, providing the neutron capture agent comprises titrating $^6$Li enriched lithium hydroxide with hydrofluoric acid to provide precipitated $^6$LiF particles, and collecting the precipitated particles. In some embodiments, the neutron capture agent is $^6$LiF nanoparticles that are about 200 nm or about 100 nm or smaller. In some embodiments, the $^6$LiF nanoparticles are provided by ball milling (e.g., cryo ball milling) larger particles.

In some embodiments, pressing and heating the mixture comprises heating the mixture to a temperature of about 260° C. to about 300° C. In some embodiments, the method of making a film or molded coupon further comprises stretching the film. In some embodiments, the stretching is performed at a temperature of between about 120° C. and about 150° C. In some embodiments, the stretching is biaxial or uniaxial stretching. In some embodiments, the method further comprises thermally annealing the film. In some embodiments, the annealing is performed at a temperature between about 150° C. and about 180° C.

In some embodiments, the presently disclosed subject matter provides a method of making a polymer composite comprising a polymeric matrix material, a neutron capture agent and an organic or inorganic luminescent fluor, wherein the method comprises solution casting a solution comprising the matrix material, the neutron capture agent, and the luminescent fluor. In some embodiments, the solution comprises tetrahydrofuran as a solvent.

In some embodiments, the presently disclosed subject matter provides a fiber comprising a polymer composite comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material.

In some embodiments, the fiber is prepared by electrospinning, extrusion, meltblowing, and/or meltdrawing. In some embodiments, the fiber has an average diameter between about 200 nm and about 500 microns. In some embodiments, the fiber is prepared from a polymer composite comprising $^6$Li salicylate or $^6$LiF as the neutron capture agent and polystyrene (PS) or a blend of poly(2-vinylnapthalene) (P2VN) and polystyrene (PS) as the matrix material. In some embodiments, the presently disclosed subject matter provides a fiber mat comprising the fiber comprising the polymer composite.

In some embodiments, the presently disclosed subject matter provides a method for detecting neutron radiation, wherein the method comprises: providing a polymer composite wherein said polymer composite comprises a matrix material comprising at least one aromatic polymer or copolymer, a neutron capture agent comprising a $^6$Li compound distributed within the matrix material, and an organic or inorganic luminescent fluor distributed within the matrix material; disposing the polymer composite in the path of a beam of radiation, wherein the matrix and the luminescent fluor of the polymer composite emit light when the composite absorbs said radiation; and detecting neutron radiation by detecting the light emitted by the composite, wherein the detecting discriminates between neutron and gamma radiation, further wherein said detecting comprises detecting the light emitted by the composite to provide a photodetection signal and processing the photodetection signal using pulse shape discrimination. In some embodiments, the detecting and/or discrimination between neutron and gamma radiation is free of the use of a low level discriminator (LLD).

In some embodiments, the at least one aromatic polymer or copolymer comprises at least one aromatic moiety selected from the group comprising naphthylene, anthracene, fluorene, terphenyl, phenanthrene, pyridine, furan, and thiophene. In some embodiments, the matrix material comprises at least one aromatic polymer or copolymer selected from the group comprising an aromatic polyester, an aromatic polyamide, an aromatic polyether, an aromatic polyimide, an aromatic polythioester, an aromatic vinylpolyether, an aromatic vinylpolyester, an aromatic vinylpolyamide, and an aromatic vinylpolythioester.

In some embodiments, the matrix material comprises an aromatic polyester. In some embodiments, the aromatic polyester is selected from the group comprising polyethylene naphthalate (PEN), polytrimethylene naphthalate (PTN), poly(9H-fluorene-9,9-dimethanol malonate), poly(9H-fluorene-9,9-dimethanol terephthalate), and poly(4,4'-(9-fluorenylidene)-diphenol terephthalate). In some embodiments, the matrix material comprises an aromatic vinylpolyester, an aromatic vinylpolyamide, or an aromatic vinylpolythioester, wherein said aromatic vinylpolyester, aromatic vinylpolyamide, or aromatic vinylpolythioester comprises a derivatized polyacrylic or polyalkylacrylic acid, wherein acid groups of the polyacrylic or polyalkylacrylic acid are derivatized to form ester, thioester or amide linked side chains, wherein the side chains comprise aromatic groups.

In some embodiments, the neutron capture agent comprises $^6$LiF micro- or nanoparticles. In some embodiments, the organic or inorganic luminescent fluor is selected based on acceptor donor resonance and/or from the group comprising 2,5-diphenyloxazole (PPO), 1,4-bis-(5-phenyloxazol-2-yl) (POPOP), anthracene, 9,9,9',9',9",9"-hexakis(octyl)-2,7', 2',7"-trifluorene, n-terphenyl, 2-biphenyl-5-phenyl-1,3-oxazole, 2-biphenyl-5(α-naphthyl)-1,3-oxazole, 2-phenyl-5-(4-biphenylyl)-1,3,4-oxadiazole, 2-(4'-tert-butylphenyl)-5-(4"-biphenylyl)-1,3,4-oxadiazole, n-bis-(o-methylstyryl)-benzene 1,4-di-(5-phenyl-2-oxazolyl)-benzene, conjugated polymeric and oligomeric dyes, metal organic framework dyes, quantum dots, two-photon absorber semiconductor fluors, and mixtures thereof.

In some embodiments, the composite has a ratio of matrix material to neutron capture agent of between about 3:1 by weight and about 1:2 by weight. In some embodiments, the composite comprises about 5% or less by weight of the organic or inorganic luminescent fluor.

In some embodiments, the composite comprises $^6$Li salicylate or $^6$LiF as a neutron capture agent and poly(2-vinylnaphthalene) (P2VN) as a matrix material. In some embodiments, the composite comprises $^6$LiF as a neutron capture agent and PEN as a matrix material.

In some embodiments, the polymer composite is in the form of a film. In some embodiments, the film is prepared by solution casting a solution comprising the matrix material, the neutron capture agent, and the luminescent fluor. In some embodiments, the film has a thickness of about 500 microns or less. In some embodiments, the film is a biaxially or uniaxially stretched film. In some embodiments, the film is thermally annealed. In some embodiments, the matrix material comprises PEN, the neutron capture agent comprises $^6$LiF micro- or nanoparticles, and the film is a stretched and/or thermally annealed film. In some embodiments, the film has a neutron count rate per mg of $^6$Li of between about 4 and about 12 counts per second (cps).

In some embodiments, the polymer composite is in the form of a fiber or fiber mat. In some embodiments, the fiber or fiber mat is prepared from a polymer composite comprising $^6$Li salicylate or $^6$LiF as the neutron capture agent and polystyrene (PS) or a blend of poly(2-vinylnapthalene) (P2VN) and polystyrene (PS) as the matrix material.

In some embodiments, the presently disclosed subject matter provides an apparatus for detecting neutron radiation, wherein the apparatus comprises: polymer composite comprising a matrix material comprising at least one aromatic polymer or copolymer, a neutron capture agent comprising a $^6$Li compound distributed within the matrix material, and an organic or inorganic luminescent fluor distributed within the matrix material; a photon detector; and a processor for performing a discrimination method for processing an output of the photon detector using pulse shape discrimination for differentiating responses of the polymer composite to neutron and gamma radiation.

In some embodiments, the apparatus is free of a low level discriminator (LLD) and/or can discriminate between neutron and gamma radiation without the use of a LLD. In some embodiments, the processor comprises a waveform digitizer.

In some embodiments, the polymer composite comprises $^6$LiF as the neutron capture agent and PEN as a matrix material. In some embodiments, the polymer composite is in the form of a film. In some embodiments, the film is biaxially or uniaxially stretched and/or thermally annealed.

Accordingly, it is an object of the presently disclosed subject matter to provide polymer composites (including films, fibers and fiber mats thereof) and to fabricate detectors comprising the composites that efficiently detect thermal neutrons and that can discriminate neutron from gamma radiation.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5B shows pulse height spectra obtained by exposure to beta particle radiation for a commercial lithiated glass scintillator (GS20), a 31 micron thick stretched pure polyethylene naphthalate (PEN) film, a 75 micron thick stretched composite PEN film (containing 50 weight % $^6$LiF and 1 weight % fluor), and a 223 micron thick unstretched composite PEN film (containing 50 weight % $^6$LiF and 1 weight % fluor).

FIG. 6 is a schematic drawing of an apparatus for detecting neutron radiation according to the presently disclosed subject matter. Apparatus 10 includes photon detector 12 optically coupled to polymer composite 14. Apparatus 10 can optionally include electronics 16 for recording and/or displaying electronic signal from photon detector 12. Thus, optional electronics 16 can be in electronic communication with photon detector 12.

DETAILED DESCRIPTION

Figure 1:
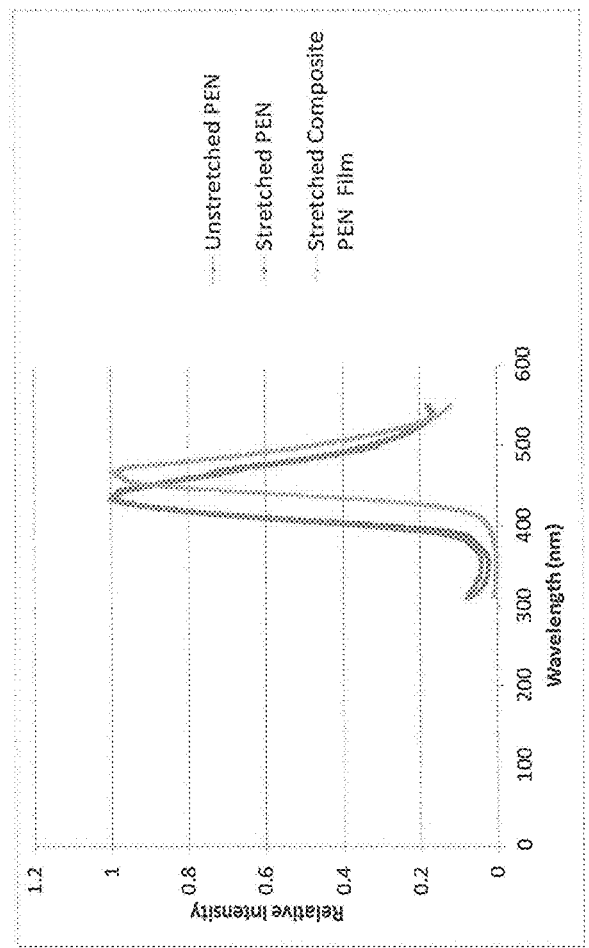
FIG. 1 shows emission spectra of unstretched pure polyethylene naphthalate (PEN) film, stretched pure PEN film, and stretched composite PEN film.

Particularly in view of projected shortages of $^3$He, there is a need for an inexpensive replacement technology for thermal neutron detection. The challenges in the development of new detectors include discriminating neutrons from background noise and other radiation like gamma and beta, getting high count rates, and increasing efficiency, light output, and resolution in neutron detection. Many Li-based detectors currently available are based on ceramic glasses that are difficult to fabricate in large size. Further, existing detector materials can be structurally rigid and expensive to fabricate.

The presently disclosed subject matter relates, in some aspects, to thin film, fiber, or fiber mat detectors for detecting thermal and epithermal neutrons in the presence of gamma radiation, and to methods of preparing the solid thin film detectors. These detectors can be based on aromatic polymer composites that include neutron capture agents. In some embodiments, the presently disclosed subject matter provides composites comprising: a polymeric matrix material comprising an organic group with a higher quantum yield than phenyl (such as, but not limited to, naphthalene, anthracene, fluorene, terphenyl, phenanthrene, pyridine, furan, and thiophene); a neutron capture agent comprising a $^6$Li compound distributed within the matrix material; and an organic or inorganic luminescent fluor (e.g., a luminescent activator or a wavelength shifter) distributed within the matrix material. The matrix and/or luminescent fluors can emit photons which can be counted by a photomultiplier tube (PMT) or a charge-coupled device (CCD) camera (or a photodiode, etc.), and signal thus obtained can be calibrated to the neutron count. In some embodiments, the presently disclosed subject matter provides $^6$LiF-based scintillator polymer composites.

In some embodiments, the presently disclosed subject matter provides a method for creating novel scintillator detectors for neutrons which are capable of discrimination of neutrons against gamma radiation. The presently disclosed detectors can also exhibit a high intrinsic efficiency for counting neutrons.

Some of the advantages of the presently disclosed neutron detectors include: (1) ease of synthesis and production, (2) economy of production, (3) intrinsic neutron to gamma discrimination, (4) high efficiency of neutron detection, (5) ease of making large volume, large area detectors in various flexible geometries, and (6) ease of implementation in public places.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. DEFINITIONS

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

Unless otherwise indicated, all numbers expressing quantities of time, temperature, neutron count rate, thickness, diameter, weight percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

As used herein the terms "microparticle" and "nanoparticle" have the meaning that would be ascribed to them by one of ordinary skill in the art. In some embodiments, "microparticle" can refer to a particle having a dimension (e.g., a width or diameter) ranging from about 1000 microns down to about 0.1 microns. In some embodiments, the microparticle has a dimension ranging from about 100 microns to about 1 micron. In some embodiments, "nanoparticle" refers to a particle having a dimension ranging from about 1 micron to about 0.1 nm. In some embodiments, the nanoparticle has a dimension ranging from about 500 nm to about 1 nm. In some embodiments, the nanoparticle has a dimension that is smaller than about 200 nm, such as but not limited to about 100 nm. Micro- and nanoparticles can be any shape, e.g., cubic, spherical, or irregularly shaped.

As used herein, a "polymerizable monomer" refers to a molecule that can undergo polymerization, thereby contributing constitutional units, i.e., a repeating atom or group of atoms, to the essential structure of a polymer macromolecule.

As used herein, a "polymer" refers to a molecule which comprises the multiple repetition of units derived from molecules of low relative molecular mass, e.g., polymerizable monomers and/or oligomers.

An "oligomer" refers to a molecule of intermediate relative molecular mass, the structure of which comprises a small plurality (e.g., 2-100, 2-50, 2-20, or 2-10) of units derived from molecules of lower relative molecular mass.

A "copolymer" refers to a polymer derived from more than one species of polymerizable monomer. Copolymers include block copolymers (containing chains of oligomers or polymers where each chain is an oligomeric or polymeric chain based on a different monomeric unit), random copolymers, where monomeric units from different monomers are randomly ordered in the copolymer, and statistical copolymers, where there is a statistical distribution of monomeric units from the different monomers in the copolymer chain.

A polymer blend refers to a mixture to two different types of already formed polymer or copolymer.

A "chain" refers to the whole or part of a polymer or an oligomer comprising a linear or branched sequence of constitutional units between two boundary constitutional units, wherein the two boundary constitutional units can comprise an end group, a branch point, or combinations thereof. A "main chain" or "backbone" refers to a chain from which all other chains are regarded as being pendant. A "side chain" refers to a smaller chain attached to the main chain. In some embodiments, a side chain can contain a single, non-repeating constitutional unit.

The terms "aryl" and "aromatic" refer to groups that can have a single aromatic ring, or multiple aromatic rings that are fused together, linked covalently, or linked to a common group, such as, but not limited to, a methylene or ethylene moiety. The term aryl can refer to both non-heterocyclic aryl groups and aryl groups wherein one or more of the carbon atom of an aromatic ring backbone has been replaced by a heteroatom. Thus, the term aryl includes heteroaryl groups, including, but not limited to, furan, thiophene, pyridine, pyrimidine, pyridazine, pyrazine, imidazole, benzimidazole, benzofuran, and triazole (e.g., 1,2,4-triazole and 1,2,3-triazole).

In some embodiments, the term aryl specifically refers to a non-heterocyclic aromatic group comprising between 6 and 26 carbon atoms in the ring structure or structures making up the aryl group backbone (i.e., the aromatic ring structure or structures excluding any aryl group substituents, as defined hereinbelow). For example, the aryl group can include monovalent radicals of benzene, biphenyl, naphthalene, anthracene, phenanthrene, chrysene, pyrene, tetracene, benzo[a]anthracene, dibenzo[a,j]anthracene, dibenzo[a,h]anthracene, dibenzo[a,c]anthracene, coronene, fluoranthene, benzo[a]pyrene, benzo[c]phenanthrene, benzo[b]fluoranthene], hexahelicine, and the like. In some embodiments, the aryl group is other than phenyl or alkyl-substituted phenyl.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "heteroaryl" refers to any aryl group as defined hereinabove, wherein one or more carbon atoms of the aryl group ring backbone or backbones is replaced by a heteroatom. The heteroatom can be N, S, O, Si, or B. Typical nitrogen-containing heteroaryl groups include, but are not limited to, pyridinyl, triazolyl, imidazolyl, pyrimidinyl, pyridazinyl, triazinyl, indolyl, quinolinyl, and the like.

The term "arylene" refers to a bivalent aromatic hydrocarbon group. Exemplary arylene groups include, but are not limited to, phenylene, napthalene, biphenylene (i.e., —C$_6$H$_4$—C$_6$H$_4$—), and the like.

"Aralkyl" refers to an aryl-alkyl-group wherein aryl and alkyl are as previously described, and included substituted aryl and substituted alkyl. Exemplary aralkyl groups include benzyl, phenylethyl, and naphthylmethyl.

The terms "carboxy" and "carboxyl" refer to carboylic acid and carboxylate groups and to their alkyl, aryl, aralkyl, and nitrogen-containing derivatives.

The terms "carboxylic acid" or "acid" can refer to the —C(=O)OH group. The term "carboxylate" refers to the deprotonated anion of a carboxylic acid (i.e., —C(=O)O$^-$). Acid and/or carboxylate groups can be "derivatized" by forming covalent bonds upon reaction with an alcohol, amine, thiol or other nucleophilic compound.

The term "ester" refers to a compound including the group —C(=O)—O—R, wherein R is alkyl, aralkyl, or aryl. Polyesters can include —C(=O)—O— linkages in a polymer chain. Thus, the term "polyester" can refer to a polymer comprising ester linkages in the polymer main chain.

The term "thioester" refers to a compound including the group —C(=O)—S—R, wherein R is alkyl, aralkyl, or aryl. Polythioesters can include —C(=O)—S— linkages in a polymer chain.

The term "amide" refers to a compound including the group —C(=O)—NR'—R, wherein R and R' are each H, alkyl, aralkyl, or aryl. Polyamides can include —C(=O)—NR'— linkages in a polymer chain.

The term "ether" refers to a compound including the group —R—O—R—, wherein each R is alkylene or arylene.

The term "imide" refers to a compound including the group —C(=)—NR'—C(=O)—R, wherein R and R' are each H, alkyl, aralkyl, or aryl. Polyimides are polymers of imide monomers. In some embodiments, polyimides can be prepared by reacting a diamine or a diisocyanide with a dianhydride.

The terms "polyarylvinyl" and "aryl vinyl polymer" refer to a polymer prepared from monomers comprising vinyl groups and aryl groups. Exemplary polyarylvinyl polymers include, but are not limited to, polystyrene and polyvinyltoluene.

The terms "vinylpolyester", "vinylpolyamide", "vinylpolythioester," and "vinylpolyether" refer to polymers of vinyl (i.e., alkene-containing) monomers having ester, amide, thioester, or ether side chains. In some embodiments, these polymers are derivatized polyacrylic acid or polyalkylacrylic acids wherein the acids groups are derivatized to form esters, thioester, or amides with aromatic group-containing alcohols, thiols or amines.

II. GENERAL CONSIDERATIONS

Neutron scintillators can employ stable isotopes with a high neutron cross section. In some embodiments, the presently disclosed subject matter provides composite materials comprising $^6$Li compounds as neutron capture agents distributed within a polymer matrix scintillator. On thermal neutron capture, the $^6$Li nucleus can undergo fission to produce charged particles with high kinetic energy (about 4.78 MeV), namely an alpha particle (about 2.05 MeV) and a triton particle (about 2.73 MeV). These high-energy charged particles can leave behind them a field of ionization along their path length as they fragment the polymeric chains of the matrix by breaking covalent bonds. These ionizations can in turn create secondary electrons, secondary ions, and excitations in the aromatic matrix of the scintillator polymer of the presently disclosed composites, all of which can directly or indirectly take part in activation of the polymer to produce excitations. Such excitations can either produce photons directly through monomer/excimer emission (characterized by quantum yield), be dissipated by vibrational means, or be transported through the matrix by random hopping to be eventually harvested by antenna molecules distributed within the matrix (e.g., energy harvesting fluors, such as inorganic or organic luminescent fluors) that can concomitantly emit photons at a longer wavelength than the matrix. The transfer of energy to the lower energy excited state of the luminescent fluor can allow for re-radiation at a wavelength where the bulk material is more transparent, such that higher quantum efficiency is achieved. Thus, according to the presently disclosed subject matter, the polymer matrix is more than simply a binder or structural element, it also produces and transports excitations efficiently.

II.A. Composites

Thus, in some embodiments, the presently disclosed subject matter provides a polymer composite comprising a polymeric matrix material. Distributed within the polymeric matrix material (e.g., non-covalently encapsulated or embedded within the polymeric matrix material) can be a neutron capture agent and an organic or inorganic luminescent fluor. The polymeric matrix material can comprise an organic polymer, copolymer or blend thereof having high energy transport efficiency and comprising at least one polymer or copolymer comprising an aromatic moiety.

Any suitable ratio of polymeric matrix material to neutron capture agent to fluor can be used. In some embodiments, the composite has a ratio of matrix material to neutron capture agent of between about 9:1 by weight to about 1:5 by weight (e.g., about 9:1, 8:1, 7:1, 6:1, 5:1, 4:1, 3:1, 2:1, 1.5:1, 1:1, 1:1.5, 1:2, 1:2.5, 1:3, 1:3.5, 1:4, 1:4.5 or 1:5). In some embodiments, the ratio of matrix material to neutron capture agent is between about 3:1 to about 1:5. In some embodiments, the ratio of matrix material to neutron capture agent is between about 3:1 and about 1:2 by weight. In some embodiments, the ratio of matrix material to neutron capture agent is between about 1:1 and about 1:5 by weight. In some embodiments, the ratio is between about 3:1 and about 1:1 by weight.

Typically, the amount of organic and/or inorganic luminescent fluor is relatively low compared to the amount of matrix material and neutron capture agent. In some embodiments, the composite comprises about 5% (e.g., about 5, 4.5, 4, 3.5, 3, 2.5, 2, 1.5, 1, or 0.5%) or less by weight of the organic or inorganic luminescent fluor. In some embodiments, the composite comprises about 1% by weight of the organic or inorganic luminescent fluor.

II.A.i. Matrix Materials

In some embodiments, the polymer matrix is selected from the group including, but not limited to, aromatic polyesters, polyamides, polyethers, polyimides, polythioesters, arylvinyl polymers (i.e., "polyarylvinyls", such as, but not limited to poly(anthrylenevinylene) (PAV) and poly(naphthalenevinylene) (PNV)), vinylpolyesters, vinylpolyethers, vinylpolyamides and polythioesters. In some embodiments, the polymer matrix is not polystyrene, polyvinyltoluene, or poly(phenylenevinylene). In some embodiments, the polymer matrix includes an aromatic moiety other than phenyl or alkyl-substituted phenyl (e.g., methylphenyl). In some embodiments, the polymer matrix is stereo-regular. In some embodiments, the polymer matrix includes an aromatic moiety that has a higher energy transport efficiency and/or quantum yield than phenyl (i.e., a higher quantum yield than about 0.07) or methyl-substituted phenyl (i.e., a higher quantum yield than about 0.17). In some embodiments, the aromatic moiety of the polymer is selected from the group including, but not limited to, naphthalene, anthracene, fluorine, terphenyl, phenanthrene, pyridine, furan, and thiophene. In some embodiments, the aromatic moieties are unsubstituted (i.e., with the exception of any bonding required to attach the aromatic moiety to the backbone of the polymeric matrix). In some embodiments, the aromatic moiety can be substituted by one or more aryl group substituents.

In some embodiments, the polymer matrix is an aromatic polyester. In some embodiments, the matrix material comprises or consists of polyethylene naphthalate (PEN) or polytrimethylene naphthalate (PTN) or a blend or copolymer of both. In some embodiments PEN and PTN can be modified by various functional groups (i.e., by one or more aryl group substituents).

Polyesters in general have good structural integrity and their synthesis is relatively straight forward. A large variety of polymers can be prepared by several different routes. Aromatic polyesters are often highly crystalline with high melting points and low solubility. Crystallinity can be decreased by introducing bulky side-groups (e.g., alkyl or aryl groups) or kinks in the polymer backbone to make more soluble polyesters.

Suitable polyesters can be prepared, for example, by reacting a dicarboxylic acid or diacid chloride with a diol in a step-growth condensation reaction, liberating water or HCl. Equimolar amounts of reactants can be used to achieve high molecular weights. In some embodiments, the dicarboxylic acid can be malonic acid and the diacid chloride can be terephthaloyl chloride. A mixture of isophthaloyl chloride and terephthaloyl chloride can be used to introduce kinks into the polymer backbone. The diol generally can contain a scintillating functional group (e.g., an aromatic moiety), such as fluorene, or another aromatic group that has a high quantum yield.

The reaction between a dicarboxylic acid and a diol can be done in a melt, and liberated water can be removed in order to force the reaction. A catalyst such as zinc acetate or antimony trioxide can be used to obtain high molecular weights in a timely fashion. The reaction between a diacid chloride and a diol can occur quickly and irreversibly at room temperature. A tertiary amine such as pyridine or triethylamine can be added to neutralize the produced HCl, resulting in the hydrochloride salt of the amine. Reactions can also be done in solution. Suitable solvents include, but are not limited to, tetrahydrofuran (THF) or dichloromethane (DCM) and other ethers, halogenated alkanes, or aromatic solvents. The reaction mixture can be heated in order to speed up the kinetics of the reaction, which should cause an increase in the molecular weight of the obtained polymer.

The structures of some exemplary polyester matrix polymers are shown in Scheme 1, below. These exemplary polyesters include poly(9H-fluorene-9,9-dimethanol malonate), which can be synthesized in the melt, is soluble in a variety of solvents, melts at about 140° C., and which turns yellow-brown in color upon melting due to decomposition of fluorine dimethanol. Poly(9H-fluorene-9,9-dimethanol terephthalate) can be synthesized by a diacid chloride route and is white in color. Poly(4,4'-(9-fluorenylidene)-diphenol terephthalate) can be synthesized by an acid chloride route, is white in color, fairly soluble in a variety of solvents and give a good fluorescence spectrum. To introduce kinks into the backbone in attempts to increase solubility mixtures of acid chlorides (e.g., 50/50 and 70/30 mixtures of terephthaloyl chloride/isophthaloyl chloride), for example, can be used.

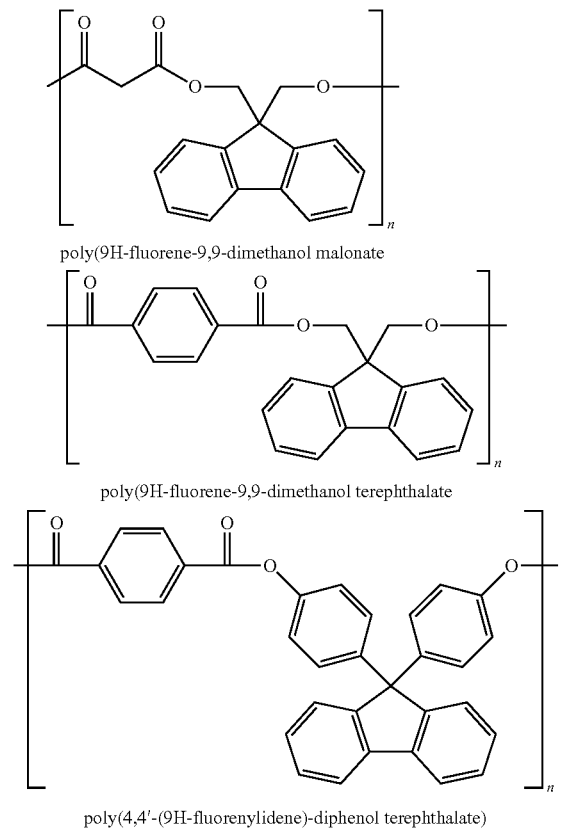

Scheme 1. Structures and Properties of Exemplary Polyester Matrix Materials.

poly(9H-fluorene-9,9-dimethanol malonate)

poly(9H-fluorene-9,9-dimethanol terephthalate)

poly(4,4'-(9H-fluorenylidene)-diphenol terephthalate)

In some embodiments, the matrix material can comprise a vinyl polymer with ester (or amide, ether, or thioester)-linked scintillating side-groups. The backbone of these vinylpolyester, vinylpolyamide, vinylpolyether, and vinylpolythioester polymers can be derived from methacryloyl chloride (or another suitable vinyl-containing acid chloride). The acid groups of a polyacrylic acid or poly(alkylacrylic acid) polymer can react with thiols or alcohols to form thioester or ester linked side chains or with amines to form amide linked side chains. The side chains can be derived from, for example, the following high quantum yield molecules: 9-anthracenemethanol, 9-fluorenemethanol, and 1,1',4',1''-terphenyl-4-thiol. Scheme 2 shows the structures of some exemplary vinylpolyesters and vinylpolythioesters.

Scheme 2. Exemplary Vinyl Polymer Structures.

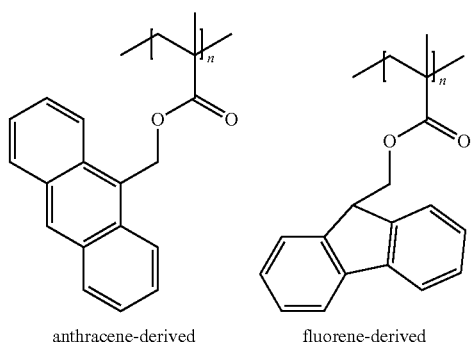

anthracene-derived     fluorene-derived

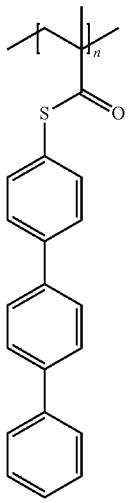

terphenyl-derived

II.A.ii. Neutron Capture Agent

Neutron scintillators can benefit from the presence of stable isotopes with a high neutron cross section. Typically, the neutron capture agent of the presently disclosed materials comprises a $^6$Li compound. However, in some embodiments, other neutron capture agents, such as those including isotopes of boron (e.g., $^{10}$B), xenon (Xe), Cadmium (Cd), hafnium (Hf), Gadolinium (Gd), Cobalt (Co), Europium (Eu), and Ytterbium (Yb) can be used. When the neutron capture agent comprises $^6$Li, suitable $^6$Li compounds can include, but are not limited to, $^6$Li-containing $LiBH_4$, LiOH, LiF, $Li_2CO_2$, LiCl, $LiBF_4$, $LiClO_4$, and Li salicylate (i.e., LiSal).

In some embodiments, the neutron capture agent is non-hygroscopic (and/or not reactive with water) or only slightly hygroscopic. By non-hygroscopic is meant a compound that does not absorb water or that does not appreciably absorb water. In some embodiments, a non-hygroscopic compound is a compound that absorbs less than 5% weight/weight of water when exposed to ambient atmospheric conditions for 24 hours or longer (e.g., 1 week or more). In some embodiments, the non-hygroscopic compound is a compound that absorbs less than 0.5% weight/weight of water when exposed to ambient atmospheric conditions for 24 hours or longer (e.g., 10 weeks) with high relative humidity (e.g., 80% relative humidity or higher). In some embodiments, the neutron capture agent is slightly hygroscopic, i.e., the agent can absorb more water than a non-hygroscopic compound, but not enough water to cause a composite material containing said agent to become mechanically unstable or to degrade its performance (e.g., as a scintillator). Thus, in some embodiments, the $^6$Li compound is non-hygroscopic, and is a compound such as, but not limited to, $^6$Li-containing LiF or $Li_2CO_3$. In some embodiments, the $^6$Li compound is slightly hygroscopic, such as, but not limited to, $^6$Li-containing $LiClO_4$ or LiSal. The non- or low hygroscopic nature of the $^6$Li compound can aid in the provision of composites and composite films that remain mechanically stable over time. Although $^6$LiSal can absorb moisture, it does not form unstable films when composites are made using arylvinyl polymers (e.g., P2VN).

In some embodiments, the $^6$Li compound is $^6$LiF. $^6$LiF is one of the few lithium compounds that is thermally stable, non-hygroscopic, and that does not violently react with water. $^6$LiF demonstrates one of the highest transparencies in the UV and near blue region of the visible spectra. Furthermore $^6$LiF has a very high density of 2.64 g/cc and has a high stoichiometric lithium content of 24%.

Generally, $^6$LiF has relatively low solubility in common organic solvents that dissolve polymers. Thus, in some embodiments, it can be advantageous to employ a $^6$Li compound that is soluble (e.g., $^6$LiSal) and forms a single phase or a nano-phase distribution within a scintillation polymer matrix. However, an alternative to a single phase system is to obtain uniformly distributed $^6$LiF phases with a minimum possible mean crystal size with low standard deviation which in turn reduces self-absorption of charged particles within $^6$LiF crystals, increases the probability of neutron interaction, and can improve transparency of the composite. $^6$LiF is also slightly soluble in THF (approximately 6 mg/mL), which can make it possible to process as a partially soluble component in a polymeric composite with uniformity in composition.

In some embodiments, the neutron capture agent comprises $^6$LiF micro- or nanoparticles. The $^6$LiF micro- or nanoparticles can be prepared by titrating lithium hydroxide with hydrofluoric acid. In some embodiments, the micro- or nanoparticles are about 100 microns or smaller (e.g., about 100, 75, 50, 25, 10, or 5 microns or smaller). In some embodiments, the micro- or nanoparticles are about 3.2 microns or smaller. In some embodiments, the $^6$LiF micro- or nanoparticles range in size from about 3.2 microns to about 200 nm (e.g., about 3.2, 3.1, 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9. 0.8, 0.7, 0.6, 0.5, 0.4, 0.3, or 0.2 microns). In some embodiments, nanoparticles are about 200 nm or less or about 100 nm or less in size. For example, $^6$LiF nanoparticles that are about 200 nm or about 100 nm or less can be prepared by size reduction of larger $^6$LiF microparticles or nanoparticles (e.g., $^6$LiF particles that are about 0.5 nm to about 10 microns in size). Size reduction can be carried out, for instance, via ball milling (e.g., cryo ball milling) the larger particles for a period of time (e.g., 10 to 20 hours). Size reduction of the particles can increase the transparency of the polymer composite films prepared with the particles, increase interactions with neutrons, and better allow charged alpha and triton particles to escape into the polymer matrix, thus improving light emission. Accordingly, size reduction of the particles can increase light yield.

In some embodiments, the composite comprises $^6$Li salicylate or $^6$LiF as a neutron capture agent and P2VN as a matrix material. In some embodiments, the composite comprises $^6$LiF as a neutron capture agent and PEN or another aromatic polyester as a matrix material.

II.A.iii. Organic and Inorganic Luminescent Fluors

The presently disclosed composites can comprise organic and/or inorganic luminescent fluors. The term "fluor" as used herein refers to a substance that displays fluorescence when excited by electromagnetic or particular radiation. The organic or inorganic luminescent fluors of the presently disclosed composites can act as energy harvesting antenna molecules to trap excitations from the matrix and to emit photons. For example, an excitation can hop from one aromatic moiety to another in the polymeric matrix until it comes within a particular distance (e.g., transfer radius) of the fluor, at which time the fluor traps the excitation and subsequently emits a photon. The fluors can act as light amplifiers when the composite materials are used as scintillation detectors and can also act as wavelength shifters for improving the efficiency of the detectors. Thus, use of the fluors can increase the quantum yield of the composites (e.g, by allowing radiation at a wavelength where the composite is more transparent).

Any suitable luminescent fluor can be used. In some embodiments, the fluor can be selected based on acceptor donor resonance, the light emission characteristics of the fluor and/or its ability to resist oxygen and/or moisture induced scintillation quenching. In some embodiments, the fluor can be selected based on overlap between the excitation spectra of the fluor and the emission spectra of the other components of the composite (e.g., the polymer matrix).

Suitable luminescent fluors include, but are not limited to, 2,5-diphenyloxazole (PPO), 1,4-bis-(5-phenyloxazol-2-yl) (POPOP), anthracene, 9,9,9',9',9",9"-hexakis(octyl)-2,7',2', 7"-trifluorene, n-terphenyl, 2-biphenyl-5-phenyl-1,3-oxazole, 2-biphenyl-5($\alpha$-naphthyl)-1,3-oxazole, 2-phenyl-5-(4-biphenylyl)-1,3,4-oxadiazole, 2-(4'-tert-butylphenyl)-5-(4"-biphenylyl)-1,3,4-oxadiazole, n-bis-(o-methylstyryl)-benzene 1,4-di-(5-phenyl-2-oxazolyl)-benzene, conjugated polymeric and oligomeric dyes, metal organic framework dyes, quantum dots, two-photon absorber semiconductor fluors and mixtures thereof.

III. FILMS

In some embodiments, the presently disclosed subject matter provides films of the presently disclosed polymer composites. The films can be used, for example, as thin scintillation detectors. The thinness of the films can allow secondary electrons to escape the scintillators, providing better neutron to gamma discrimination.

The composite films can be prepared by any suitable technique, such as, but not limited to, solution casting, hot pressing, and extrusion. For example, the film can be prepared by using an extruder such as, but not limited to, a randcastle extruder with various processing conditions (e.g., various process zone temperatures, feed rate, die slit arrangements and opening size, take off rate, and downstream cooling of the extruded film) to increase the degree of crystallinity and/or optical clarity of the film.

In some embodiments, the film can have a thickness of about 500 microns or less (e.g., about 500, 450, 400, 350, 300, 250, 200, 150, 100, 75, 50, 40, 30, 20, or 10 microns or less). In some embodiments, the film has a thickness between about 400 and about 200 microns. In some embodiments, the film has a thickness of about 220 microns or less. In some embodiments, the film has a thickness of about 50 microns or less. In some embodiments, thicker films (>500 microns) can be used, for example, when the neutron capture agent is provided as nanoparticles that are about 200 nm or less in size. In some embodiments, the presently disclosed subject matter provides thin films of composite materials where the films are as thick as about 1 millimeter. Thus, in some embodiments, the films can be about 1000, about 950, about 900, about 850, about 800, about 750, about 700, about 650, about 600, about 550, or about 500 microns thick.

In some embodiments, the film can be biaxially or uniaxially stretched. The stretching can be performed by any suitable method, e.g., mechanically or manually. In some embodiments, the stretching can be done with a commercial film stretching machine. The stretching can be performed using hot circulated air (e.g., at between about 120° C. and about 150° C.). Stretching of the films below the matrix melting point can allow polymeric chains to orient. For example, in PEN-containing composite films (or other naphthalene-containing polymer composite films), strain induced stacking of naphthalene units can be obtained much like a single crystal. Such stacking of naphthalene units can increase the energy transport efficiency of the matrix. Addition of excitation harvesting luminescent molecules in stretched films can increase the net quantum yield of the composite as compared to an unstretched film.

In some embodiments, the films or stretched films can be thermally annealed. Any suitable annealing technique can be used, e.g., free annealing, taut annealing, etc. In some embodiments, the films are thermally annealed, for example, between about 150° C. to about 180° C. (e.g., about 150, 155, 160, 165, 170, 175 or about 180° C.), using confined conditions using a ring or free annealing. Annealing the film can increase light yield when the film is used as a scintillator due to an increase in crystallinity of semi-crystalline polymer matrix materials, such as, but not limited to, polyethylene naphthalate (PEN).

In some embodiments, the film comprises a composite wherein the matrix material is selected from the group comprising, but not limited to, a polyester, a polyamide, a polyether, a polyimide, a polythioester, a vinylpolyether, a vinylpolyester, a vinylpolyamide, and a vinylpolythioester, wherein the polymer comprises at least one aromatic group. In some embodiments, the matrix material is a polyester. In some embodiments, the polyester is selected from the group comprising, but not limited to, polyethylene naphthalate (PEN), polytrimethylene naphthalate (PTN), poly(9H-fluorene-9,9-dimethanol malonate), poly(9H-fluorene-9,9-dimethanol terephthalate), and poly(4,4'-(9-fluorenylidene)-diphenol terephthalate).

In some embodiments, the film comprises a non-hygroscopic neutron capture agent, e.g., $^6$LiF micro- or nanoparticles. In some embodiments, the film comprises a composite wherein the matrix material comprises PEN, the neutron capture agent comprises $^6$LiF micro- or nanoparticles and the film is a stretched film and/or thermally annealed film.

In some embodiments, the film comprises a polymer composite having a ratio of matrix material to neutron capture agent of between about 5:1 and about 1:5 by weight (e.g., about 5:1, 4:1, 3:1, 2:1, 1:1, 1:2, 1:3, 1:4, or 1:5). In some embodiments, the film has a ratio of matrix material to neutron capture agent between about 3:1 and about 1:1 by weight. In some embodiments, the film comprises a ratio of matrix material to neutron capture agent that is about 1:1 by weight. In some embodiments, the film comprises about 5% or less (e.g., about 5%, 4.5%, 4%, 3.5%, 3%, 2%, 1.5%, 1%, or 0.5%) by weight of an organic or inorganic luminescent fluor. In some embodiments, the film comprises a polymer composite comprising about 49.5% by weight PEN, about 49.5% by weight $^6$LiF, and about 1% by weight 9,9,9',9',9",9"-hexakis (octyl)-2,7',2',7"-trifluorene. In some embodiments, the film comprises a polymer composite comprising about 70% by weight PEN, about 25% by weight $^6$LiF nanoparticles, and about 5% weight of a fluor or fluor mixture (i.e., PPO/POPOP).

Films of the presently disclosed subject matter can have a neutron count rate per mg of $^6$Li of between about 4 and about 12 counts per second (cps; e.g., about 4, 4.5, 5, 5.5, 6, 6.5, 7, 7.5, 8, 8.5, 9, 9.5, 10, 10.5, 11, 11.5, or 12 cps). In some embodiments, the neutron count rate per mg of $^6$Li is above that of a commercially available lithiated glass detector, i.e., GS20 available from Applied Scintillation Technologies, Ltd., (Harlow, United Kingdom). Thus, in some embodiments, the neutron count rate per mg of $^6$Li is above about 6.23.

In some embodiments, the film can be prepared by: providing a mixture of an aromatic polymeric matrix material, a neutron capture agent, and a luminescent fluor; and hot pressing or extruding the mixture to form the film. In some embodiments, providing the mixture comprises preparing micro- or nanoparticles of $^6$LiF; and mixing the micro- or nanoparticles with the matrix material and the luminescent fluor (e.g., in the desired weight ratios). In some embodiments, the film is further stretched (e.g., biaxially or uniaxially) and/or annealed.

IV. APPARATUS

Referring now to FIG. 6, in some embodiments, the presently disclosed subject matter provides an apparatus 10 for detecting neutron radiation wherein the apparatus comprises a photon detector 12 and a polymer composite 14 (e.g., in the form of a molded coupon, film, fiber, or fiber mat). In some embodiments, polymer composite 14 comprises a polymeric matrix material comprising an organic polymer, copolymer or blend thereof. The polymer, copolymer or blend can comprise an aromatic moiety (e.g., an aromatic moiety with high excitation transport efficiency like naphthalene and/or with a quantum yield higher than phenyl). Polymer composite 14 can comprise a neutron capture agent comprising a $^6$Li compound distributed within the matrix material and an organic or inorganic luminescent fluor distributed within the matrix material. Composite 14 can convert charged particles to light that can be collected by a CCD or a PMT or other photon detector 12 efficiently and at a fast rate. The composite can be structurally flexible, thus providing capability for producing apparatuses with various geometries and sizes. The apparatuses can be easily implemented in public places without complications in operations.

Thus, in some embodiments, apparatus 10 can comprise a photon detector 12 and a polymer composite 14 comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material. In some embodiments, polymer composite 14 is in the form of a film (i.e., an unstretched film, an uniaxially stretched film, or a biaxially stretched film). In some embodiments, the film (e.g., the stretched film) is further annealed. In some embodiments, the film has a thickness of about 500 microns or less (e.g., about 500, 450, 400, 350, 300, 250, 200, 150, 100, 75, 50, 40, 30, 20, or 10 microns or less). In some embodiments, the film has a thickness between about 400 nm and about 200 microns. However, in some embodiments, the films can be as thick as about 1 millimeter. Thus, in some embodiments, the films can be about 1000, about 950, about 900, about 850, about 800, about 750, about 700, about 650, about 600, about 550, or about 500 microns thick.

In some embodiments, the polymer matrix is selected from the group including, but not limited to, aromatic polyesters, polyamides, polyethers, polyimides, polythioesters, arylvinyl polymers (polyarylvinyls), vinylpolyesters, vinylpolyethers, vinylpolyamides and polythioesters. In some embodiments, the polymer matrix does not comprise polystyrene, polyvinyltoluene, or poly(phenylenevinylene). In some embodiments, the polymer matrix includes an aromatic moiety other than phenyl or alkyl-substituted phenyl (e.g., methylphenyl). In some embodiments, the polymer matrix includes an aromatic moiety that has a higher energy transport efficiency and/or quantum yield than phenyl. In some embodiments, the aromatic moiety of the polymer is selected from the group including, but not limited to, naphthalene, anthracene, fluorine, terphenyl, phenanthrene, pyridine, furan, and thiophene. In some embodiments, the matrix material is a polyester. In some embodiments, the polyester is selected from the group comprising, but not limited to, polyethylene naphthalate (PEN), polytrimethylene naphthalate (PTN), poly(9H-fluorene-9,9-dimethanol malonate), poly (9H-fluorene-9,9-dimethanol terephthalate), and poly(4,4'-(9-fluorenylidene)-diphenol terephthalate).

In some embodiments, the neutron capture agent comprises $^6$LiF or $^6$LiSal. In some embodiments, the neutron capture agent comprises $^6$LiF micro- or nanoparticles.

Referring again to FIG. 6, photon detector 12 can be any suitable detector or detectors and can be optically coupled to the scintillator (i.e., the polymer composite) for producing an electrical signal in response to emission of light from the scintillator. Thus, photon detector 12 can be configured to convert photons to an electrical signal. Electronics associated with photon detector 12 can be used to shape and digitize the electronic signal. Suitable photon detectors 12 include, but are not limited to, photomultiplier tubes, photodiodes, CCD sensors, and image intensifiers. Apparatus 10 can also include electronics 16 for recording and/or displaying the electronic signal.

In some embodiments, the presently disclosed subject matter provides an apparatus that can detect neutron radiation and discriminate neutron from gamma radiation using pulse shape discrimination. In some embodiments, the apparatus comprises: (a) a polymer composite, wherein the polymer composite comprises a matrix material, wherein the matrix material comprises an organic polymer, copolymer or blend thereof, and wherein the matrix material comprises at least one polymer or copolymer comprising an aromatic moiety (i.e., wherein the matrix material comprises at least one aromatic polymer or copolymer), a neutron capture agent distributed within the matrix material, wherein the neutron capture agent comprises a $^6$Li compound, and an organic or inorganic luminescent fluor distributed within the matrix material; (b) a photon detector; and (c) a processor for performing a discrimination method for processing an output of the photon detector using pulse shape discrimination for differentiating responses of the polymer composite to neutron and gamma radiation. In some embodiments, the matrix material comprises PEN. In some embodiments, the neutron capture agent is $^6$LiF (e.g., $^6$LiF micro- or nanoparticles). In some embodiments, the polymer composite is in the form of a film, which can optionally be stretched (biaxially or uniaxially) and/or thermally annealed.

Accordingly, referring again to FIG. 6, the apparatus can include polymer composite 14, photon detector 12 (e.g., wherein polymer composite 14 and photon detector 12 are optically coupled, for example, using optical grease), and electronics 16, wherein electronics 16 includes a module capable of performing a discrimination method for processing an output of photon detector 12 using PSD. For instance, electronics 16 can include a fast waveform digitizer. Photon detector 12 can be a fast PMT.

Suitable photodetectors for light pulse collection for PSD-related embodiments include, but are not limited to, fast time PMTs; avalanche photodiodes (APDs); and scintillator-coupled charge-coupled devices (CCDs), including CCDs having the feature of electron multiplier gain, i.e., EMCCDs. Any suitable fast rate digitizer, including a fast digital oscilloscope, can be used for pulse digitization for subsequent analysis. Thus, for example, in some embodiments, such as to collect the data shown in FIGS. 9, 10A, and 10B, a polymer composite scintillation film of the presently disclosed subject matter can be mounted with optical grease to the photocathode of a PMT (e.g., a Hamamatsu R6233-100 PMT (Hamamatsu Photonics K.K.; Hamamatsu, Japan) with light collection properties optimized for spectroscopy using a fast waveform digitzer (e.g., a Stuck SIS3305 Waveform Digitizer (5 GSPS, 10 bit, 200 picosecond per sample; Stuck Innovative Systeme GmbH, Hamburg, Germany).

In some embodiments, the apparatus is free of a low level discriminator (LLD) and/or can distinguish between neutron and gamma radiation without the use of a LLD.

V. FIBERS AND FIBER MATS

In some embodiments, the presently disclosed subject matter provides a fiber comprising the presently disclosed polymer composites. Thus, in some embodiments, provided herein is a polymer composite comprising: a polymeric matrix material, wherein the matrix material comprises an organic polymer, copolymer or blend thereof, and wherein the matrix material comprises at least one polymer or copolymer comprising an aromatic moiety; a neutron capture agent distributed within the matrix material, wherein the neutron capture agent comprises a $^6$Li compound; and an organic or inorganic luminescent fluor distributed within the matrix material.

The fibers can be prepared by any suitable method known in the art, such as, but not limited to electrospinning, extrusion, meltblowing, and/or meltdrawing. For example, in some embodiments, a solution of the matrix material (or a precursor thereof, such as partially polymerized materials), the neutron capture agent, and an organic or inorganic luminescent fluor can be prepared; and fibers can be prepared by electrospinning, extruding, meltblowing, or meltdrawing the solution. The solutions can be prepared from any suitable solvent. In some embodiments, the solvent is chloroform, dimethylformamide (DMF), tetrahydrofuran (THF), or a mixture comprising two of more of chloroform, DMF, and THF. In some embodiments, the solution comprises about 10 weight % by volume or less of the polymer matrix material (e.g., about 10, 9, 8, 7, 6, 5, 4, 3, 2, or 1% by volume or less). In some embodiments, the solution comprises about 5 weight % by volume of the polymer matrix material.

In some embodiments, the fibers have an average diameter of between about 200 nm and about 500 microns. In some embodiments, the fibers have an average diameter between about 5 microns and about 500 microns. In some embodiments, the fibers have an average diameter of between about 200 nm and about 3.2 microns. In some embodiments, the fibers have an average diameter of between about 200 nm and about 1400 nm (e.g., about 200, 250, 300, 350, 400, 450, 500, 550, 600, 650, 700, 750, 800, 850, 900, 950, 1000, 1050, 1100, 1150, 1200, 1250, 1300, 1350, and 1400 nm). In some embodiments, the fibers have an average diameter of between about 400 and about 800 nm. In some embodiment, the fibers have an average diameter of 500 nm or less. In some embodiments, the fibers are nanofibers having an average diameter that is about 200 nm or smaller (e.g., about 150, 100, 75, 50, 40, 30, 20, 10, or 5 nm or smaller).

In some embodiments, the fiber is prepared from a polymer composite comprising $^6$Li salicylate or $^6$LiF as the neutron capture agent. In some embodiments, the fibers are prepared from a polymer composite comprising an aryl vinyl polymer (AVP) or an AVP blend as the matrix material; however, other polymers can also be used. In some embodiments, the matrix material is polystyrene (PS) or a blend of poly(2-vinylnaphthalene) (P2VN) and PS. The fibers can comprise nanophase domains (domains having diameters of less than about 50, 40, 30, 20, 10, 5, 4, 3, 2, or 1 microns) of the neutron capture agent distributed within the matrix. In some embodiments, the fluor is selected from the group comprising, but not limited to, PPO, POPOP, and anthracene. In some embodiments, the composite comprises between about 10 and about 20 weight % of the neutron capture agent. In some embodiments, the composite comprises less than about 10% by weight of the fluor.

In some embodiments, fiber mats containing a plurality of the fibers can be provided. The fiber mats are typically nonwoven, but can also be woven, if desired.

VI. METHODS OF DETECTING NEUTRON RADIATION

In some embodiments, the presently disclosed subject matter provides a method of detecting neutron radiation, wherein the method comprises: providing a polymer composite according to an embodiment of the presently disclosed subject matter; disposing the polymer composite in the path of a beam of radiation, wherein the matrix material and/or the luminescent fluor of the polymer composite emits light when the composite absorbs said radiation; and detecting neutron radiation by detecting the light emitted by the composite, wherein the detecting discriminates between neutron and gamma radiation. The polymer composite can be in the form of a film, a molded coupon, a fiber, or a fiber mat. In some embodiments, the polymer composite in is the form of a film. In some embodiments, the film is biaxially or uniaxially stretched and/or thermally annealed.

In some embodiments, the method comprises the use of a suitable detector or detectors optically coupled to the polymer composite for producing an electrical signal in response to emission of light from the composite. Thus, in some embodiments, the method comprises using a photon detector in combination with the polymer composite. Suitable photon detectors include, but are not limited to, photomultiplier tubes, photodiodes, CCD sensors, and image intensifiers.

One particularly useful type of radiation detection is pulse shape discrimination (PSD). As used herein, PSD refers to discrimination between light emission caused by neutron radiation and light emission caused by gamma radiation based on a difference in pulse shape between photodetection signals from a photodetector (i.e., signals of light emitted by a scintillator material in response to radiation and detected and converted to an electronic signal by a photodetector). A pulse shape of a photodetection signal can refer to a peak shape from occurrence of light emission to decay thereof in a graph with time plotted on the horizontal or x axis and magnitude/amplitude of the signal plotted on the vertical or y axis. PSD is based on the fact that decay time of light emission caused by neutron radiation is longer than decay time of light emission caused by gamma radiation. By using the difference in decay times for thermal neutrons and gammas and using suitable algorithms for PSD analysis to discriminate neutron/gamma events and obtain high count rates with excellent neutron/gamma rejection (for example, smaller than one in one million as currently targeted by the U.S. Department of Homeland Security), neutron detection can be performed with very low false positives in an environment with high gamma rays background.

Figure 9:
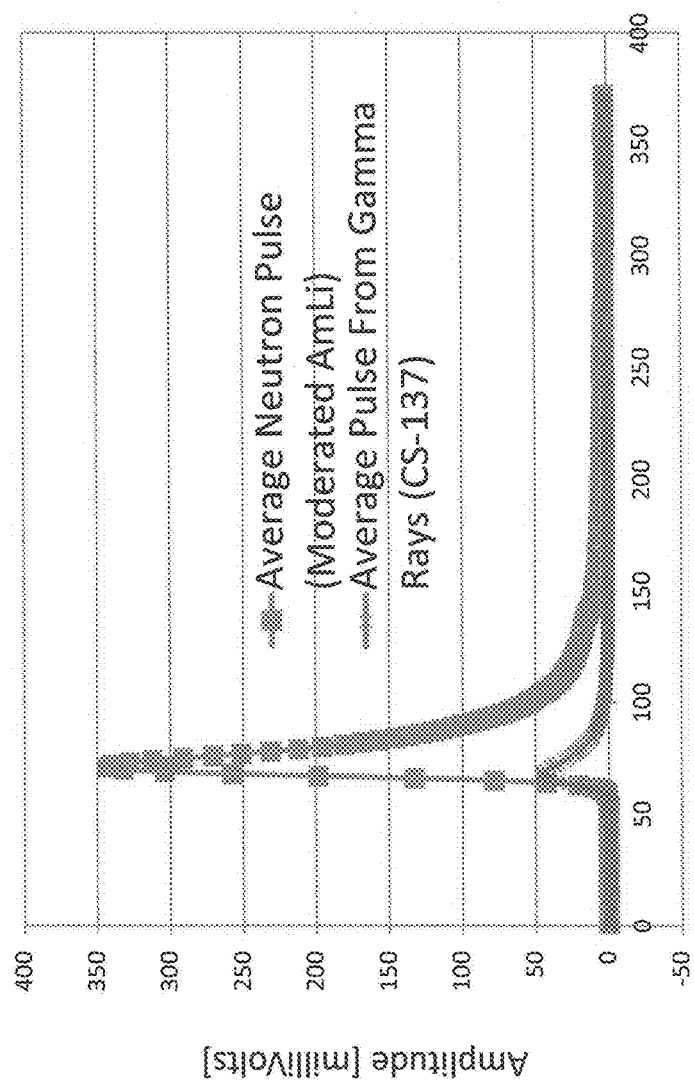
FIG. 9 is a graph showing the pulse shape differences between thermal neutron and gamma radiation as detected using a polymer composite scintillator material of the presently disclosed subject matter. Examination of pulse shape differences was conducted by comparing statistically averaged waveforms from specific pulse height regions. An AmLi source was used for generating neutrons and a Cs-137 source was used to generate gamma radiation. Data for the average neutron pulse is shown in squares, while that for the average pulse from gamma rays is shown in "x"s. The y-axis shows pulse amplitude (in milliVolts), while the x-axis is reflective of time. The units of the x-axis correspond to consecutive data point number, wherein the time between two consecutive data points corresponds to 0.2 nanoseconds. Thus, 50 units corresponds to 10 nanoseconds.

In some embodiments of the presently disclosed subject matter, average neutron pulse shape can be different from average gamma pulse shape. As shown in FIG. 9, generally, the pulse shape for each type of radiation has a steep component and a tail component. The steep component relates to light produced by polymer composite scintillator material relatively soon or immediately after the radiation exposure. This light can be referred to as prompt light. The tail component relates to light produced over a period of time, which can be referred to as delayed light. As seen in FIG. 9, the tail component for the neutron pulse shape is larger than that for the gamma pulse shape.

Modern high-speed waveform digitizers allow for separation of neutron and gamma pulse shapes, giving rise to rapid characterization of PSD properties. More particularly, in some embodiments, a pulse shape can be numerically integrated over two time intervals: e.g., $\Delta_{prompt}$ and $\Delta_{delayed}$, corresponding to the prompt and delayed light components of the pulse shape, respectively. The ratio of the charge integrals for the two time intervals, i.e., prompt/delayed, also referred to herein as the PSD parameter, indicates whether the considered event was likely produced by a neutron (small PSD parameter value, e.g., below about 2.5) or a gamma ray (large PSD parameter value, e.g., above about 2.5). The determination that a PSD value is small or large can depend on, e.g., the type of PMT used, and, thus is desirably adjusted depending upon the apparatus used. Also, since pulse shape can vary depending upon apparatus configuration, it can be desirable that the values of the integral ranges be experimentally checked and adjusted before measurements.

In some embodiments, the presently disclosed subject matter provides a method for detecting neutron radiation wherein the method comprises discriminating between neutron and gamma radiation using PSD. Thus, in some embodiments, the presently disclosed subject matter provides a method for detecting neutron radiation wherein the method comprises: providing a polymer composite according to an embodiment of the presently disclosed subject matter (e.g., a polymer composite comprising a matrix material comprising at least one aromatic polymer or copolymer, a neutron capture agent comprising a $^6$Li compound distributed within the matrix material, and an organic or inorganic luminescent fluor distributed within the matrix material); disposing the polymer composite in the path of a beam of radiation, wherein the matrix and the luminescent fluor of the polymer composite emit light when the composite absorbs said radiation; and detecting neutron radiation by detecting the light emitted by the composite wherein the detecting discriminates between neutron and gamma radiation. The detecting can comprise detecting the light emitted by the composite to provide a photodetection signal and processing the photodetection signal using PSD. In some embodiments, the detecting and/or discrimination between neutron and gamma radiation is free of the use of a LLD. In some embodiments, the detecting comprises the use of a fast waveform digitizer.

VII. METHODS OF MAKING POLYMER COMPOSITES

In some embodiments, the presently disclosed subject matter provides a method of making a film or a molded coupon comprising a polymer composite of the presently disclosed subject matter. The method can comprise: providing the neutron capture agent (e.g., providing micro- or nanoparticles of the neutron capture agent, such as micro- or nanoparticles of $^6$LiF); mixing the neutron capture agent (e.g., the micro- or nanoparticles of the neutron capture agent) with a polymeric matrix material and a luminescent fluor to form a mixture; and pressing and heating the mixture to form the film or molded coupon. Thus, in some embodiments, the presently disclosed subject matter relates to preparing a mixture (e.g., a solid powder mixture) of a matrix material (e.g., a partially polymerized resin or resin mixture of an organic polymer, copolymer or polymer blend or polymerizable monomers for the polymer matrix material), a neutron capture agent (e.g., micro- or nanoparticles of a neutron capture agent), and an organic or inorganic luminescent fluor (e.g., a luminescent activator and/or a wavelength shifter); and hot pressing or extruding the mixture to form a film or a thick coupon wherein the neutron capture agent and luminescent fluor are distributed within the matrix material (e.g., non-covalently encapsulated within pores in the polymer matrix). Suitable extruders include, but are not limited to, randcastle extruders. Processing conditions (e.g., process zone temperatures, feed rate, die slit arrangements and opening size, take off rate, downstream cooling, etc.) can be adjusted to increase the degree of crystallinity and optical clarity.

In some embodiments, the matrix material is powdered (e.g., using a high speed grinder) prior to mixing with the neutron capture agent and the luminescent fluor. In some embodiments, the mixture is ground in to a powder (e.g., using a high speed grinder) and sieved and/or blended (e.g., in a vortex mixer or by stirring or shaking mechanically or manually) to obtain a homogenous mixture. In some embodiments, the mixture is sieved through a 500 µm or smaller sieve (e.g., through a 500, 450, 400, 350, 300, 250, 200, 150, 100, 50 µm or smaller sieve).

In some embodiments, the neutron capture agent is $^6$LiF micro- or nanoparticles that are 3.2 microns or smaller in diameter. The $^6$LiF micro- or nanoparticles can be provided, for example, by titrating $^6$Li-enriched lithium hydroxide with hydrofluoric acid to precipitate $^6$LiF particles, and collecting the precipitated particles (e.g., by vacuum filtration). The collecting can also include washing (e.g., with water) the particles to remove impurities and/or drying the particles.

In some embodiments, the neutron capture agent is $^6$LiF nanoparticles that are about 200 or about 100 nm or smaller. The $^6$LiF nanoparticles can be prepared by pulverizing larger $^6$LiF particles (e.g., $^6$LiF particles that are about 0.5 to about 10 microns or about 1 to about 3 microns in size). The pulverizing can be performed by, for example, by ball milling (e.g., cryo ball milling) the larger $^6$LiF particles for a period of time (e.g., between about 10 to 20 hours) to achieve the desired size reduction.

In some embodiments, pressing and heating the mixture comprises heating the mixture to a temperature of between about 260° C. and about 300° C. (e.g., about 260, 270, 280, 290, or 300° C.). In some embodiments, the film can be stretched (e.g., uniaxially or biaxially). The stretching can be performed manually or mechanically. In some embodiments, the stretching is performed using a commercial film stretcher. In some embodiments, the stretching is performed at a temperature between about 120° C. and about 150° C. (e.g., at about 120, 125, 130, 135, 140, 145, or 150° C.). In some embodiments, the film can be thermally annealed, for example, at a temperature between about 150° C. and about 180° C. (e.g., at about 150° C., 155° C., 160° C., 165° C., 170° C., 175° C. or 180° C.). The annealing can increase the crystallinity of the composite.

In some embodiments, the film can be prepared by solution casting a solution comprising the matrix material, the neutron capture agent and the luminescent fluor. In some embodiments, the solution comprises THF, DMF, chloroform, or mixtures thereof. In some embodiments, the presently disclosed subject matter relates to a microwave-based high pressure volumetric heating process to obtain $^6$LiF distribution within a polymer matrix by completely dissolving $^6$LiF and a polymer fluor system in a common solvent. In some embodiments, the solution cast film can be stretched (biaxially or uniaxially) and/or thermally annealed.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Synthesis of Poly(4,4'-(9-fluorenylidene)-diphenol terephthalate)

In a vial with a septum and a stir-bar, 4,4'-(9-fluorenylidene)-diphenol (1.2615 g, 3.6 mmol) is dissolved in THF (8 mL), and pyridine (0.6 mL, 7.2 mmol) is added. The vial is sealed, evacuated using an aspirator, and refilled with argon. This evacuation and refilling is repeated two more times. In a separate vial with a septum, terephthaloyl chloride (0.7308 g, 3.6 mmol) is dissolved in THF (3 mL). The vial is sealed, evacuated and refilled with argon like above. While stirring, the diol solution is heated to 65° C., and the acid chloride solution is added drop-wise with a syringe over about ten minutes. The mixture is then allowed to stir for an additional hour. Upon cooling, the polymer mixture is dropped into vigorously stirred methanol (120 mL). The precipitated polymer is then suction filtered and dried in a vacuum desiccator. White polymer is obtained. A typical yield is 70 to 80%.

Example 2

Vinylpolyester and Vinylpolythioester Synthetic Procedure

Methacryloyl chloride is dissolved in THF in a vial with a septum and a stir bar. The vial is evacuated and refilled with argon three times. Equimolar amounts of an alcohol or thiol and pyridine dissolved in THF are added dropwise with a syringe to the methacryloyl chloride solution. The solution is stirred for one hour and/or until formation of the vinyl monomer with ester-linked side group is complete (e.g., as determined by thin layer chromatography or by gas or liquid chromatography). A solution of azobisisobutyronitrile (AIBN) in THF is then added to the vial with a syringe to initiate polymerization, and the solution is heated overnight at a temperature of 70 to 80° C. The polymer is then precipitated in methanol, filtered, and dried.

Example 3

Poly(2-Vinylnaphthalene) Composite Films $^6$Li-salicylate ($^6$LiSal) was prepared by dissolving salicylic acid in acetone and heating it to 60° C. $^6$LiOH monohydrate was dissolved in a 2:1 mixture of acetone and deionized water and sonicated for 10 minutes. Then the salicylic acid solution was titrated by adding the $^6$LiOH solution dropwise. The resulting solution was kept at 60° C. with stirring for 18 hours to evaporate the solvent. The resulting white powder was dried in a vacuum oven at 60° C. for 72 hours.

Solutions containing varying amounts of poly(2-vinylnaphthalene) (P2VN; Polymer Source, Inc., Dorval, Quebec, Canada) and $^6$LiSal in 1.5 mL anhydrous THF were placed under vacuum to remove dissolved air and stored under an argon atmosphere. Films were cast in a glove bag in a dry nitrogen atmosphere. THF was evaporated and the films dried in a vacuum at 50° C. to remove any residual solvent. Translucent films about 46 mm in diameter, with thicknesses ranging from 85 to 110 microns were obtained. Some phase separation was detected by optical microscopy, which showed what appeared to be $^6$LiSal domains separated within the P2VN matrix. It is also possible that pores formed in the polymer matrix during solvent evaporation. It is expected that broadening the molecular weight distributions of the polymer to include shorter chains as plasticizers and/or limiting the thickness of the cast films can reduce phase separation and pore formation.

Thin film samples (110 microns thick) of equal weight and composition of P2VN and polyvinyl toluene (PVT) doped with 25 weight % $^6$LiSal (but without additional fluor) were prepared as described above for P2VN films. Thin films can be exposed to radiation flux using acrylic and cadmium cylinders as described in Sen et al. (*IEEE Transactions on Nuclear Science*, 58(3), 1386-1393 (2011)). Superior light output was observed with the P2VN based detector. Pure P2VN and PVT films without $^6$LiSal were exposed to the same radiation flux and did not show any scintillation response. There were no major changes in P2VN fluorescence spectra of samples that were held under nitrogen as compared to air-equilibrated samples, indicating that the detectors were stable to oxygen.

Films having equal total weight (200 mg), but different weight % of $^6$LiSal and different thicknesses were prepared and subjected to thermal neutron flux. See Table 1, below. The best composition based on relative light output observed was 25 weight % $^6$LiSal.

TABLE 1

Relative Light Output of $^6$LiSal/P2VN Films

| Sample | Wt % $^6$LiSal | Relative Light Output using Cf-252 (relative to sample 3) | Integral Count Rate (Counts/sec) | Film Thickness (μm) |
|---|---|---|---|---|
| 1 | 10 | 0.70 | 32.4 | 94 |
| 2 | 15 | 0.70 | 37.9 | 92 |
| 3 | 25 | 1.00 | 45.7 | 89 |
| 4 | 40 | 0.70 | 63.0 | 85 |
| 5 | 50 | 0.60 | 74.5 | 82 |
| 6 | 60 | 0.30 | 85.0 | 79 |
| 7 | 75 | 0.25 | 76.1 | 75 |

To increase the thickness of the detectors, multiple layers of films were stacked. Each film had a composition of 22 weight % $^6$LiSal and 2 weight % of an additional fluor, 9,9,9',9',9'',9''-hexakis(octyl)-2,7',2',7''-tetrafluorene (i.e., ADS038FO, from American Dye Source, Inc., Baie-D'Urfé, Quebec, Canada). The composite films had an emission peak at 420 nm (matching the emission peak for the fluor) when excited with 270 nm light, demonstrating efficient energy transport and migration from naphthalene to the fluor. The decay time for the film was 3 ns, matching the decay time of the fluor. The net neutron response for stacking up to four films is shown in Table 2, which includes comparative data from a 2 mm lithiated glass scintillator GS20 (Applied Scintillation Technologies, Ltd., Harlow, United Kingdom).

TABLE 2

Multilayer $^6$LiSal/P2VN Detectors

| Number of Layers | Scintillator Mass (mg) | Relative Light Output using Cf-252 | Integral Count Rate (Counts/sec) |
|---|---|---|---|
| 2 mm thick disk | GS20-2460 | 1 | 653.7 |
| 1 | 120 | 1.17 | 14.4 |
| 2 | 204 | 1.02 | 19.6 |
| 3 | 290 | 0.97 | 32.7 |
| 4 | 411 | 0.87 | 52.3 |

As can be seen from Table 2, neutron sensitivity of GS20 is an order of magnitude higher as compared to the composite films. However, without being bound to any one theory, it is believed that this is due at least in part to the matrix being an amorphous polymer and the composite being opaque. The light output of the composite films was comparable to GS20.

Example 4

Polyester/$^6$LiF Composite Thin Films $^6$LiF particles were synthesized by titration of lithium-6 enriched lithium hydroxide (prepared by dehydrating 97.6% $^6$Li lithium hydroxide monohydrate) with hydrofluoric acid as shown in the equation:

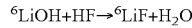

$$^6\text{LiOH} + \text{HF} \rightarrow {}^6\text{LiF} + \text{H}_2\text{O}$$

The $^6$LiF particles were examined with a scanning electron microscope (SEM). Image processing and measurements of the particle size were performed with the ImageJ image software program (available on the internet from the National Institutes of Health). The synthesized nanoparticles had sizes between at least 0.1 microns and 3.2 microns, with a modal size of 750 nm.

Polyethylene naphthalate (PEN) pellets (available from Goodfellow Corporation, Oakdale, Pa., United States of America) were ground to powder with a commercial grinder and sieved through a 150 µm sieve. The PEN powder was mixed with ADS156FS dye (American Dye Source, Inc., Baie-D'Urfé, Quebec, Canada) and $^6$LiF nanopowder for 10 minutes in a vortex mixer. Circular samples were pressed within kapton sheets in a hot press at 300° C., providing films of 50 mm diameter and varying thicknesses. SEM imaging of the films showed a featureless surface, while dark field microscope imaging indicated that the $^6$LiF particles were non-agglomerated and fairly well distributed within the PEN matrix at 35 weight % loading.

Scintillation measurements were made using three sample composite thin film detectors comprising 25 weight % $^6$LiF, 74 weight % PEN, and 1 weight % ADS156FS dye and compared to measurements taken using a 2 mm thick lithiated glass disc scintillator (GS20, Applied Scintillation Technologies, Ltd., Harlow, United Kingdom). Scintillation measurements were performed as described in Sen et al. (*IEEE Transactions in Nuclear Science* (2012), vol. 59(4), 1781-1786). The net thermal neutron count rate for a 220 µm thick 480 mg PEN composite film was 505 counts per second (cps), while that for a 150 µm thick 375 mg PEN composite film was 426 cps, that for a 66 µm thick 120 mg PEN composite film was 74 cps, and that for the glass disc scintillator was 498 cps. Thus, the composite films had comparable count rates to GS20. The responses of the films to alpha, beta and gamma radiation were also determined. There was a lack of a Compton edge on the gamma spectrum for the films. Without being bound to any one theory, this lack is believed to be due to secondary electrons not depositing their energy in the film as the Compton electrons are escaping the thin film.

There was separation between the neutron and gamma spectra for the sample films, providing the potential for discrimination based on pulse height. The neutron efficiency and count rates at various gamma efficiency pulse height discriminator levels are shown in Table 3, below, for the 150 µm thick film and in Table 4, below, for the 66 µm thick film.

TABLE 3

Intrinsic efficiencies of a 150 µm thick PEN/$^6$LiF composite film.

| LLD Setting | Gamma Intrinsic Efficiency | Neutron Intrinsic Efficiency | Neutron Count Rate |
|---|---|---|---|
| 226 | $5 \times 10^{-2}$ | 0.4047 | 423 |
| 1276 | $5 \times 10^{-3}$ | 0.2909 | 304 |
| 2676 | $5 \times 10^{-4}$ | 0.1734 | 179 |
| 4176 | $5 \times 10^{-5}$ | 0.0469 | 47.8 |

TABLE 4

Intrinsic efficiencies of a 66 µm thick PEN/$^6$LiF composite film.

| LLD Setting | Gamma Intrinsic Efficiency | Neutron Intrinsic Efficiency | Neutron Count Rate |
|---|---|---|---|
| 176 | $5 \times 10^{-2}$ | 0.0705 | 74 |
| 926 | $5 \times 10^{-3}$ | 0.0682 | 72 |
| 2026 | $5 \times 10^{-4}$ | 0.0556 | 59 |
| 3976 | $5 \times 10^{-5}$ | 0.0239 | 26 |
| 5676 | $5 \times 10^{-6}$ | 0.0016 | 1.9 |

Example 5

Stretched Polyethylene Naphthalate (PEN)/$^6$LiF Composite Thin Films

Film Preparation:

PEN was purchased from Goodfellow Corporation (Oakdale, Pa., United States of America). The ADS156FS luminescent molecule (chemical formula $C_{112}H_{136}O_{21}S$, American Dye Source, Inc., Baie-D'Urfé, Quebec, Canada) was used to increase the quantum yield of the composite and selected based on its high quantum yield, resonance energy transport ranges and resistance to luminescence quenching in the presence of moisture. Pure PEN resin had an excitation maximum at 258 nm and an emission peak at 430 nm. The decay times for pure PEN were 6 ns and 19 ns. ADS156FS has an absorption peak at 382 nm, photoluminescent maximum at 432 nm and decay time of 3 ns.

$^6$LiF nanoparticles were synthesized as described above in Example 4. The synthesized nanoparticles had a modal size of 750 nm.

PEN chips, $^6$LiF nanoparticles and ADS156FS were mixed in a weight ratio of 49.5:49.5:1 PEN:$^6$LiF:ADS156FS, ground into a powder in a high speed grinder, sieved through a 150 µm sieve, blended in a vortex mixer for ten minutes to obtain a homogeneous blend, and dried in vacuum at 110° C. The mixture was weighed and formed into a film on a hot press at 280° C. at $1.7 \times 10^7$ Pascal (Pa). For comparison, PEN chips alone were subjected to grinding, sieving, blending and drying and also formed into a pure PEN film using the hot press.

The pure PEN and composite films were biaxially stretched by 1.5×1.5 on an AccuPull™ laboratory biaxial film stretcher (Inventure Laboratories Incorporated, Knoxville, Tenn., United States of America) which drew the film simultaneously in the machine direction (MD) and the transverse direction (TD) in a single step. Stretching can cause orientation of the polymer chains in the direction of the stretch and improve the crystallization of the film. Circular samples 50 mm in diameter were cut for analysis. The thicknesses of the films were as follows: unstretched pure PEN film, 75 microns; biaxially stretched pure PEN film 43 microns; unstretched composite PEN film, 150 microns; biaxially stretched composite PEN film, 41 microns.

Emission and excitation spectra of the film samples were characterized on a Hitachi F4500 fluorescence spectrophotometer at a voltage of 400 volts and slit of 2.5 mm. Transmission spectra of the film samples were characterized on a Cary WinUV spectrophotometer. The alpha, beta, gamma and neutron response of the film samples were characterized and scintillation measurements were made as described in Sen et al. (*IEEE Transactions in Nuclear Science* (2012), vol. 59(4), 1781-1786). Alpha, beta, gamma and neutron response for the pure and composite PEN films were measured at 1200V. A GS20 glass disc scintillator (Applied Scintillation Technologies, Ltd., Harlow, United Kingdom) having a diameter of 25 mm, a thickness of 2 mm, and a mass of 2.461 g was used for comparison.

Transmission Spectra:

The biaxially stretched composite PEN films appear to be more luminescent in UV light than unstretched pure PEN or biaxially stretched pure PEN films. The transmission spectra of the pure and composite films showed that UV light is strongly absorbed below 380 nm. Unstretched pure PEN film had a high optical transmittance (between 50% and 80% in the visible region), and the film appeared translucent. Stretched pure PEN film has optical transmission between 63% and 69% in the visible region. Biaxially stretched composite PEN films had no transmission. This lack of transmission is believed to be due, at least in part, to very high loading of $^6$LiF, which is opaque and also causes light scattering (which could not be detected by the small detector of the instrument). All three films appeared translucent under natural light. Biaxially stretched pure PEN film was the most transparent, as it had a lesser thickness than the unstretched pure PEN film and did not contain $^6$LiF.

Emission Spectra:

Unstretched PEN film, which is amorphous, emits fluorescence. See FIG. 1. The emission spectra are mirror images of absorption spectra of PEN, and fluorescence occurs from the lowest energy level of the singlet-excited states. The fluorescence peak at about 380-390 nm of the pure PEN film spectra is assigned to monomer fluorescence because of its coincidence with that of dimethyl 2,6-naphthalate, whereas the peak around 420-430 nm was assigned to be excimer fluorescence because the excitation spectrum monitored at 430 nm coincided with that for the monomer fluorescence.

Emission spectra of unstretched PEN film and biaxially stretched PEN films excited at 310 nm show peaks at 434-436 nm, whereas biaxially stretched composite PEN films excited at 310 nm show peaks at 466-468 nm. See FIG. 1. The fluorescence spectrum of naphthalene shows emission at 323 nm and 335 nm. The high-energy charged reaction products can excite electrons in the aromatic group of the polymer matrix of the scintillation detector and can generate secondary electrons. It appeared that the PEN excimers can have an excited level corresponding to the emission peaks of 434-436 nm. The excitons can either produce photons directly through excimer emission or can harvested by the luminescent molecules that concomitantly emit photons at a longer wavelength than the polymer matrix.

Figure 2:
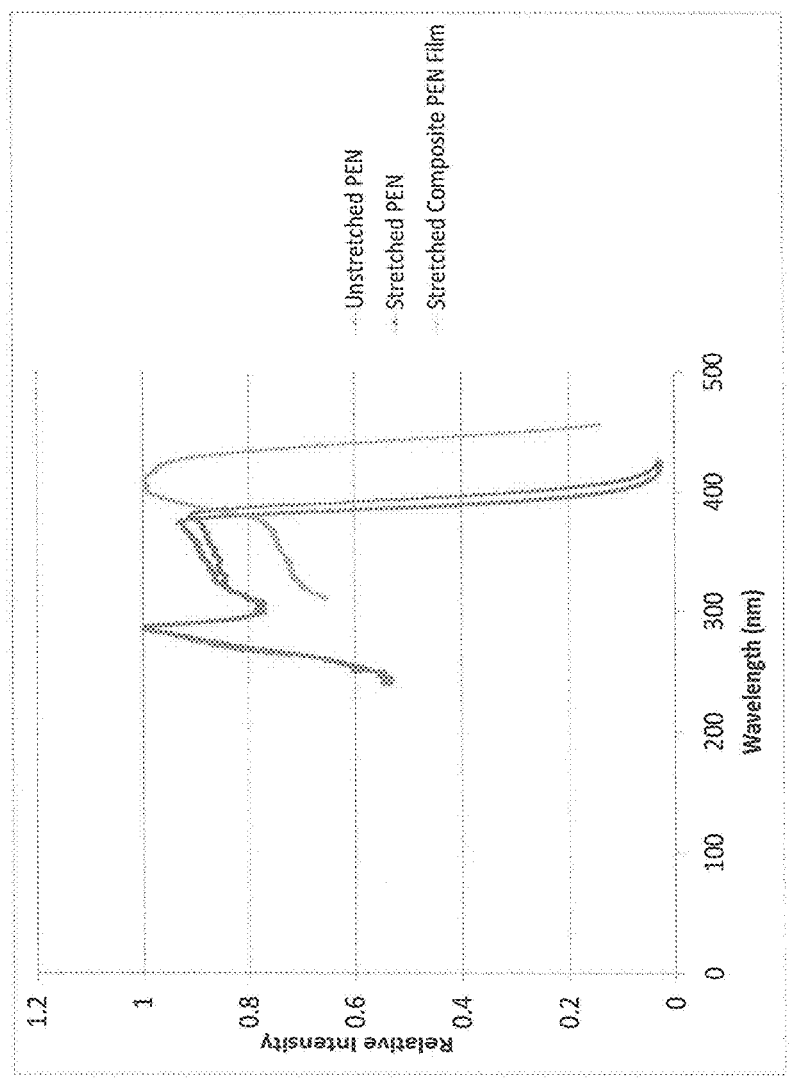
FIG. 2 shows excitation spectra of unstretched pure polyethylene naphthalate (PEN) film, stretched pure PEN film, and stretched composite PEN film.

Excitation Spectra:

Excitation spectra of unstretched PEN film and biaxially stretched PEN films observed at 430 nm show absorption band peaks at 285-286 nm and 375-379 nm, whereas biaxially stretched composite PEN films observed at 430 nm show two absorption band peaks, one at 287 nm and second band peaks at 372 nm, 400 nm, and 427 nm. See FIG. 2. The fluorescence spectrum of naphthalene showed excitation at 266 nm, 275 nm, and 285 nm.

The absorption band peaks of biaxially stretched composite PEN films are shifted toward longer wavelengths because of the presence of wavelength shifting fluor. The absorption peaks correspond with the excitation peaks. The peak with a maximum at 413 nm and two shoulders at 392 nm and 430 nm is attributed to the fluorescence of an excimeric configuration of the PEN molecule. PEN can exhibit a low rate of intersystem crossing of the monomeric unit. See Cheung et al., *Appl. Polym. Sci.*, 24, 1809-1830 (1979).

Figure 3:
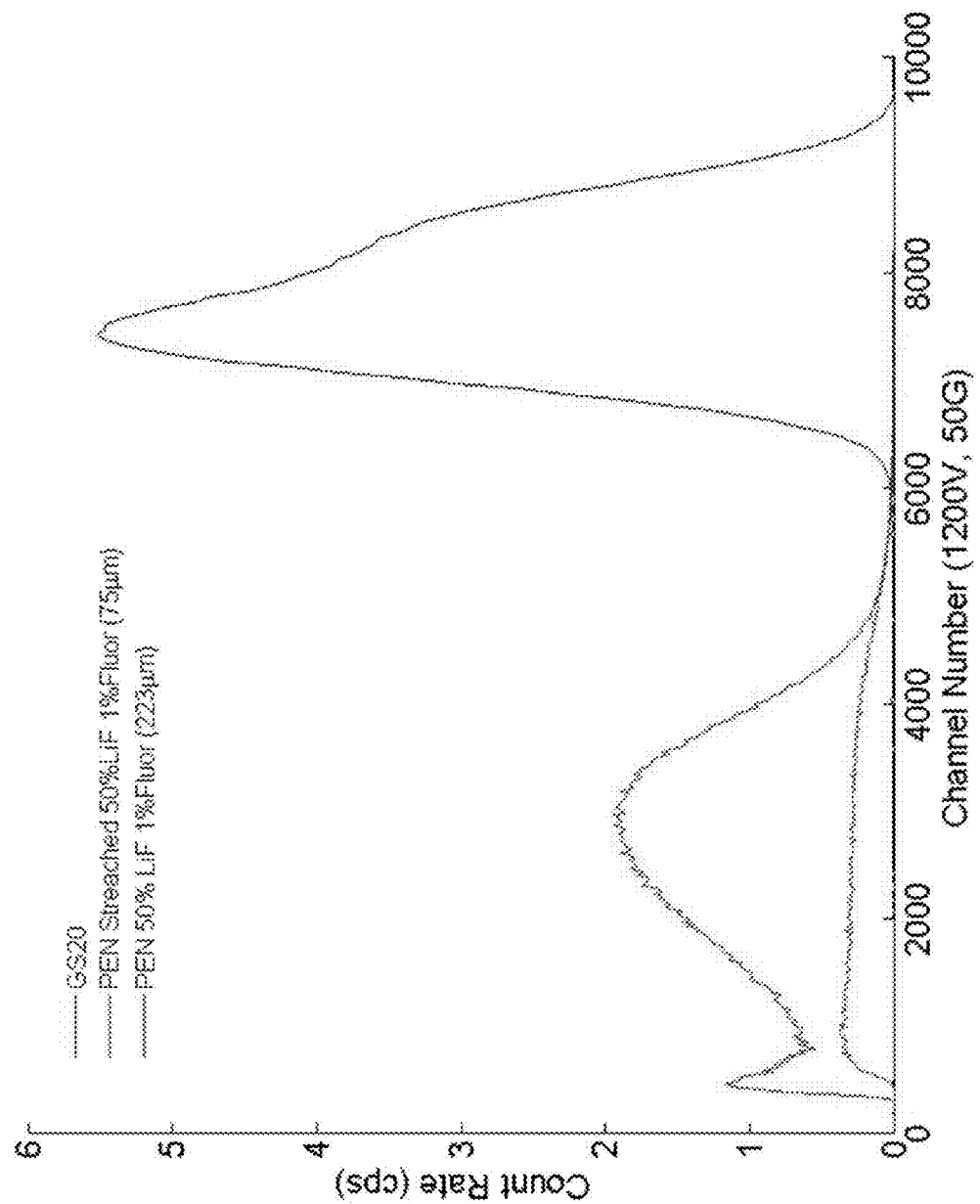
FIG. 3 shows neutron count rate spectra for an unstretched composite polyethylene naphthalate (PEN) film and a stretched composite PEN film. The composite films have a PEN matrix with 50 weight % $^6$LiF and 1 weight % of a fluor. For comparison, the spectra of a commercial lithiated glass scintillator (GS20) which is 2 mm (i.e., 2,000 microns) thick is also shown.

Neutron Response:

Thermal neutrons interact with $^6$Li and produce charged α particles and triton with kinetic energy sufficient to excite the aromatic units of the PEN of the scintillation detector. The energy released as kinetic energy during neutron capture by $^6$Li is split into 2.73 MeV for the triton and 2.05 MeV for the α particle. The neutron count rates of the PEN films are presented in Table 5, below, and the neutron count spectra are shown in FIG. 3. The count rates for stretched and unstretched composite films were compared to that of a 2 mm thick lithiated glass scintillator (GS20, Applied Scintillation Technologies, Ltd., Harlow, United Kingdom). The choice of amplifier time constant determines the degree of charge collection from the tube. Time constant of 2 µs or greater resulted in nearly complete charge collection and yield spectra. The unstretched composite PEN film with a mass of 521 mg had a count rate of 265 cps, whereas the stretched composite PEN film with a mass of 76 mg had a count rate of 62 cps. The GS20 had a count rate of 442 cps. A significant increase (60%) in the count rate per mg $^6$Li was observed for the stretched composite film as compared to the unstretched composite film. The count rate per mg $^6$Li of the stretched composite film was found to be higher than that for GS20.

Without being bound to any one theory, a scintillation detector with high crystallinity is believed to be capable of capture of higher incident high-energy particles to generate a greater number of photons. The efficiency of singlet-singlet energy transfer given in steady-state experiments depends, for example, upon excitation energy, which is brought into the neighborhood of the luminescent molecule singlet level by the naphthalene singlet band, luminescent molecule/polymer fluorescence ratio, excitation exchange interactions, the lifetime, the luminescent molecule/polymer energy difference, the temperature, and system defects and impurities. See Argyfukis and Kopelman, *Chemical Physics*, 51, 9-16 (1980). A crystal provides a highly efficient energy transport system to luminescent molecules as it has fewer defect sites or imperfections in the lattice. Defect sites or imperfections can act as traps for the annihilation of excitons. See Ratnera et al., *Nuclear Instruments and Methods in Physics Research A*, 486, 463-470 (2002). The luminescent molecules within the presently disclosed polymer matrix can harvest the resonant energy transferred (RET) from excited naphthalene molecules and emit photons. RET depends upon the degree of spectral overlap, distance and the orientation of transition moments between the luminescent molecule and the polymer. See Andrews, *Can. J. Chem.*, 86, 855-870 (2008).

TABLE 5

Neutron Performance of PEN Films

| Sample | Mass (mg) | Mass $^6$Li (mg) | Neutron Peak | Count rate (cps) | Count rate per mg $^6$Li |
|---|---|---|---|---|---|
| Unstretched composite PEN film | 521 | 62.52 | ~3000 | 265 | 4.24 |
| Stretched composite PEN film | 76 | 9.12 | ~2000 | 62 | 6.80 |
| GS 20 | — | 71.00 | 7,342 | 442 | 6.23 |

A broad neutron peak for unstretched composite PEN film was observed at approximately 3000, whereas a broad neutron plateau was observed for stretched composite PEN film. An unstretched film had a thickness of 150 µm and is thick enough to capture the energy deposited by charged reaction products but the stretched composite PEN film had a thickness of 41 µm, which is less than the range of charged reaction products. So it is believed possible that the charged reaction products do not deposit the full energy in the stretched film. The energy deposited by charged reaction products within the crystals is efficiently transported by luminescent molecules, which produced net radioluminescence response with lower pulse height deficit.

Figures 4A, 4B:
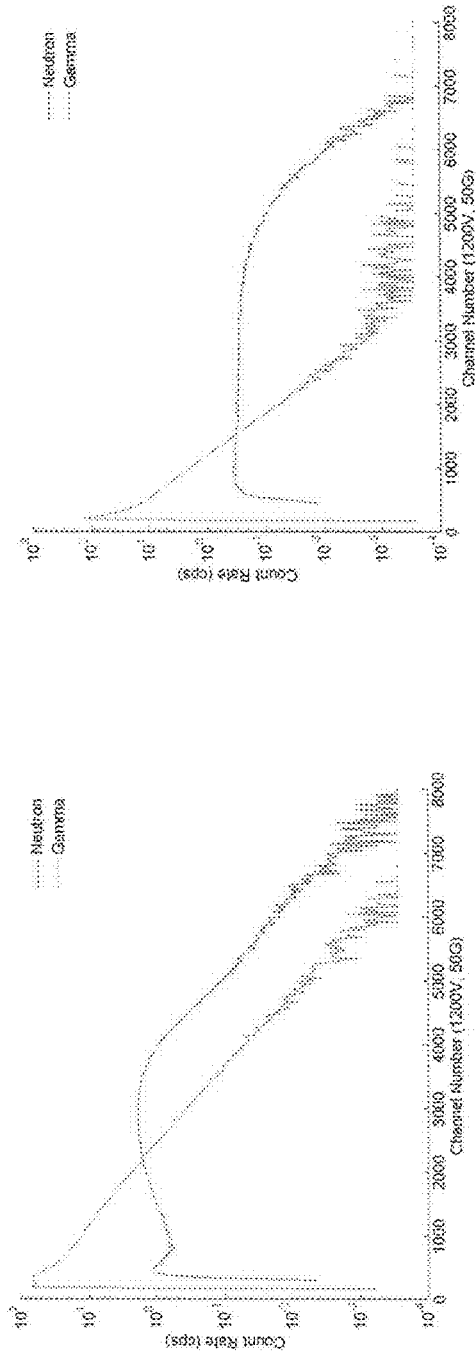
FIG. 4A shows neutron and gamma discrimination curves for the unstretched composite polyethylene naphthalate (PEN) film described in FIG. 3.
FIG. 4B shows neutron and gamma discrimination curves for the stretched composite polyethylene naphthalate (PEN) film described in FIG. 3.

Neutron-gamma discrimination curves for unstretched and stretched composite PEN films are shown in FIGS. 4A and 4B. The stretched composite PEN film showed better discrimination. The effect of energy deposited by gamma and charged particles became clearly separable leading to thermal neutron discrimination because of the lower thickness of the stretched composite PEN film. The low pulse height from gamma-ray events can be due to secondary electrons that are knocked off by gamma rays to escape thin detectors. The stretched composite PEN films appear to have low susceptibility to gamma-induced scintillation and thus can be effective discriminators for thermal neutrons. At low LLD settings, the electronic system is paralyzed by the processing of low amplitude noise, while at high LLD values, the count rate decreases due to the loss of neutron detection events. Based on FIGS. 4A and 4B, if the LLD is set at 3000 for the stretched composite PEN films, neutron-gamma discrimination can be established and yields the possibility of discrimination based on pulse height. However, suitable LLD settings can vary depending upon the gain used for a given PMT, scintillation material composition, and attachment settings.

Figure 5A:
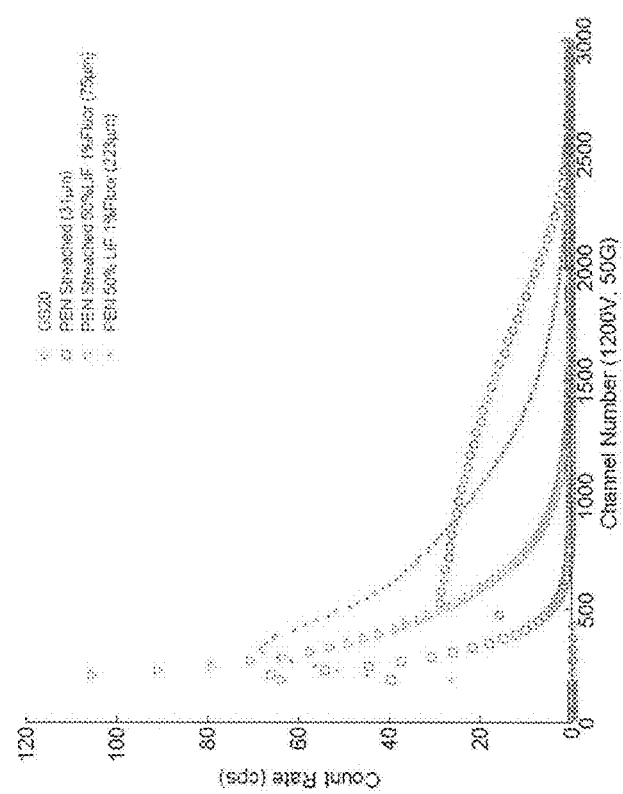
FIG. 5A shows pulse height spectra obtained by exposure to alpha particle radiation for a commercial lithiated glass scintillator (GS20; open circles), a 31 micron thick stretched pure polyethylene naphthalate (PEN) film (open squares), a 75 micron thick stretched composite PEN film (containing 50 weight % $^6$LiF and 1 weight % fluor; open triangles), and a 223 micron thick unstretched composite PEN film (containing 50 weight % $^6$LiF and 1 weight fluor; filled diamonds).
Figure 5C:
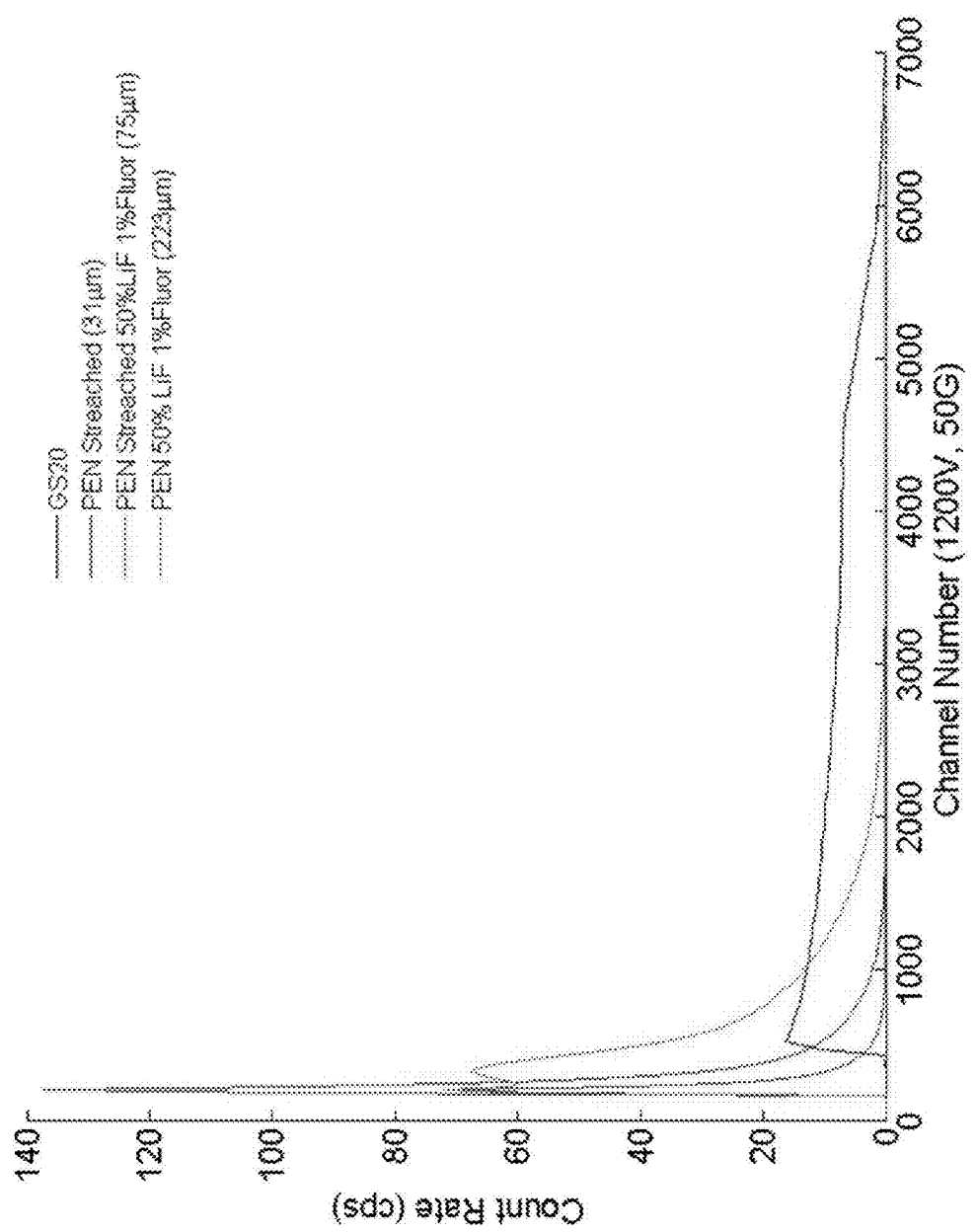
FIG. 5C shows the pulse height spectra obtained by exposure to gamma particle radiation for a commercial lithiated glass scintillator (GS20), a 31 micron thick stretched pure polyethylene naphthalate (PEN) film, a 75 micron thick stretched composite PEN film (containing 50 weight % $^6$LiF and 1 weight % fluor), and a 223 micron thick unstretched composite PEN film (containing 50 weight % $^6$LiF and 1 weight % fluor).

Alpha, Beta and Gamma Response:

Pulse height spectra were obtained by exposing the unstretched and stretched pure and composite PEN films to alpha ($^{241}$Am), beta ($^{36}$Cl), and gamma ($^{60}$Co) particles. See FIGS. 5A, 5B, and 5C, respectively. The photoelectron yield is the number of photoelectrons created at the photocathode of the PMT. The total number of the counts in the photopeak can be calculated from the area under the spectral curve in the photopeak zone. The light yields of various PEN films are provided in Table 6. All values are scaled to 1200 V, 50 G. The GS20 $^{60}$Co measurement reported is the Compton edge.

TABLE 6

Light Yield of Stretched vs. Unstretched PEN Films.

| Sample | $^{241}$Am Peak | $^{36}$Cl End point | $^{60}$Co End Point |
|---|---|---|---|
| Unstretched Pure PEN | 3,095 | 2,512 | 2,080 |
| Stretched Pure PEN | 1,703 | 1,107 | 1,559 |
| Unstretched Composite PEN | 2,256 | 1,904 | 2,831 |
| Stretched Composite PEN | 1,706 | 1,706 | 5,327 |
| GS20 | 4,002 | 6,740 | 5,530 |

The stretched composite PEN film had about 30% higher light output than unstretched composite PEN film. See FIG. 5A. Stretched film samples were approximately one fourth as thin as unstretched composite PEN films, so the alpha particles were not able to deposit on the stretched films as much. However, as the stretched composite PEN film had higher crystallinity, which results in more efficient energy transport to luminescent molecules, it generated a higher number of photons as compared to unstretched composite PEN film.

Stretched composite PEN films have low alpha to beta ratio and hence neutron/gamma discrimination. The low gamma-ray sensitivity can be due to the high thermal-neutron capture cross-section, the large 4.78 MeV energy of the reaction products and the thinness of the detectors. Thicker PEN films have more interactions than the thinner PEN films. Photopeaks were observed at less than 500 keV by the film samples as the secondary electrons at higher energy had greater probability to escape without deposition of energy in the 41 to 150 micron film samples.

Compton scattering was observed for unstretched composite PEN films and was absent in the case of stretched composite PEN films. Lack of Compton scattering can be attributed to non-deposition of the energy of the electrons in the thinner stretched composite PEN films. The broadness of the photopeaks can also be due to the thin samples or from an increase in the transfer resolution due to the optical transmission of the sample. Pulse height spectroscopy of a thicker unstretched composite PEN film sample yielded a smaller photopeak, suggesting that light yield was significantly degraded due to poor light propagation in the sample. Scattered light trace out a longer distance and therefore will be attenuated to a greater extent in the presence of impurities and quenching.

Conclusions:

Unstretched and stretched pure as well as composite PEN films embedded with $^6$LiF and a wavelength shifting luminescent molecule were fabricated. The stretched composite detectors effectively discriminate between thermal neutrons and gamma radiation, due at least in part because the film samples were thin (in some embodiments having a thickness of 41 microns). Low atomic number components have low susceptibility to gamma-induced scintillation and thus are effective discriminators for thermal neutrons. The effect of energy deposited by gamma and charged particles became clearly separable leading to thermal neutron discrimination because of the higher degree of crystallinity in the scintillation detector. Stretched composite PEN films have low alpha to beta ratio and hence, neutron/gamma discrimination due to higher crystallinity. A 60% increase in the count rate per mg $^6$Li was observed for the stretched composite film as compared to the unstretched composite film. The count rate per mg $^6$Li of stretched film was found to be higher than that for a $^6$Li-based transparent glass detector (GS20). The stretched composite PEN film had about 30% higher light output than unstretched composite PEN film. The energy deposited by charged particles within such oriented molecules is efficiently harvested by luminescent molecules, which produced net radioluminescence response with lower pulse height deficit.

Example 6

Annealed Composite Films Comprising $^6$LiF Nanoparticles

Synthesis of LiF Nanoparticles:

$^6$LiOH was dissolved in methanol to remove impurities. The impurities are insoluble in methanol and can be collected on a filter paper. The methanol was evaporated and the purified $^6$LiOH collected.

The dried purified $^6$LiOH was dissolved in de-ionized water by vigorous stirring (at about 350 to 400 rpm) for about 30 to 60 minutes. Once dissolution was complete, the $^6$LiOH solution was treated with a solution of hydrofluoric acid (HF) according to the equation:

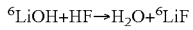

$$^6\text{LiOH} + \text{HF} \rightarrow \text{H}_2\text{O} + {}^6\text{LiF}$$

The resulting liquid was then poured into a cold acetone bath and subsequently filtered. All reactions were performed in TEFLON™ (E.I. DuPont de Nemours and Company, Wilmington, Del., United States of America) beakers to avoid silicon impurities in the final product. The acetone mixture was vacuum filtered through a 1 μm filter paper. The filtrate was collected and retained, while the filtrant was allowed to dry. The filtrate was then passed through a 450 μm filter paper. The resulting filtrate was allowed to dry.

Resulting $^6$LiF particles were subjected to cryo ball milling for 10 to 20 hours to provide nanoparticles of very small sizes (i.e., less than 100 nm).

Processed Composite Films:

Composite films were prepared by mixing about 25 weight % of the $^6$LiF nanoparticles, about 70 weight % PEN, and about 5 weight % PPO/POPOP and then blending the mixture in a vortex mixer to obtain a homogenous blend. The homogenous blend was dried in a vacuum. The dried blends were weighed and formed into cast composite polymer films.

Unstretched cast composite films (UCFs) were post processed by different technologies. In particular, the UCFs were annealed at 150° C. to provide processed composite polymer films (PCFs). Circular samples of 50 mm diameter size were cut from the UCFs and PCFs for further characterization.

Tables 7 and 8 below show the impact of post-processing on neutron count rate and brightness. For comparison with the UCFs and PCFs, data is also provided for a 2 mm commercial lithiated glass scintillator (GS20; Applied Scintillation Technologies, Ltd., Harlow, United Kingdom). An increase of between 70% to 90% in neutron count rate above gamma LLD and a 40% increase in brightness was observed for the PCFs compared to the UCFs. Neutron count rate above gamma LLD for the PCFs was three to five times higher than that for GS20. Without being bound to any one theory, it is believed that the post-processing provides increased crystallinity in the composite films, which can increase their efficiency in detecting thermal neutrons and in neutron-gamma discrimination.

TABLE 7

Neutron Performance

| Sample (thickness) | Gamma LLD such that $\xi_{int}$ yn < $10^{-6}$ (Channel Number) | Neutron Count rate above $\xi_{int}$ yn < $10^{-6}$ (cps) |
|---|---|---|
| UCF (158 μm) | 3702 | 12.50 |
| PCF (158 μm) | 5053 | 21.20 |
| UCF (167 μm) | 3879 | 7.19 |
| PCF (167 μm) | 5525 | 13.51 |
| GS20 (2000 μm) | 4000 | 4.5 |

TABLE 8

Film Brightness

| Sample | Neutron End Point (Channel Number) |
|---|---|
| UCF (140 μm) | 2031 |
| PCF (140 μm) | 2823 |
| GS20 (2000 μm) | 4087 |

Figure 7:
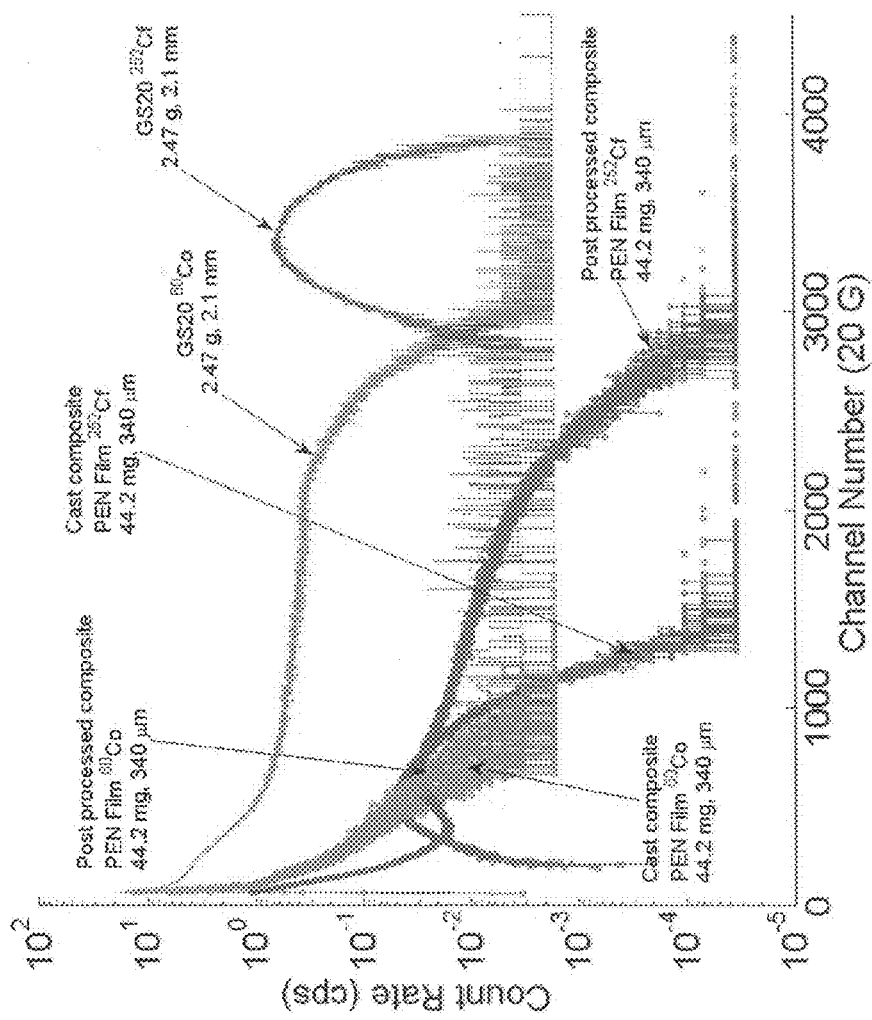
FIG. 7 is a graph showing gamma count rate (red) and net neutron count rate (green) spectra for composite films comprising 70 weight polyethylene naphthalate (PEN), 25 weight % $^6$LiF, and 5 weight % fluor (a mixture of 2,5-diphenyloxazole (PPO) and 1,4-bis-(5-phenyloxazol-2-yl) (POPOP)). Curves are shown for both an unstretched cast composite film (Cast composite PEN Film; total mass 44.2 milligrams (mg), 340 microns (µm) thick) and a thermally annealed cast composite film (Post processed composite PEN film, total mass 44.2 mg, 340 µm thick). The gamma count was measured using response to cobalt 60 ($^{60}$Co) and the net neutron count rate was measured using response to californium 252 ($^{252}$Cf). For comparison, the spectra of a commercial lithiated glass scintillator (GS20) which is 2.1 millimeters (mm) thick (i.e., 2,100 microns thick; total mass 2.47 grams (g)) are also shown.

FIG. 7 shows gamma ($^{60}$Co) and net thermal neutron ($^{252}$Cf) responses for the UCFs and PCFs (i.e., for 44.2 mg mass samples, with film thicknesses of 340 microns). For comparison, gamma and net thermal neutron response is also shown for a GS20 sample (2.47 grams, 2.1 mm). If the count rates are normalized for $^6$LiF amount, the thin film composites have a significantly higher count rate per mg of $^6$LiF than the lithiated glass scintillator.

Figure 8:
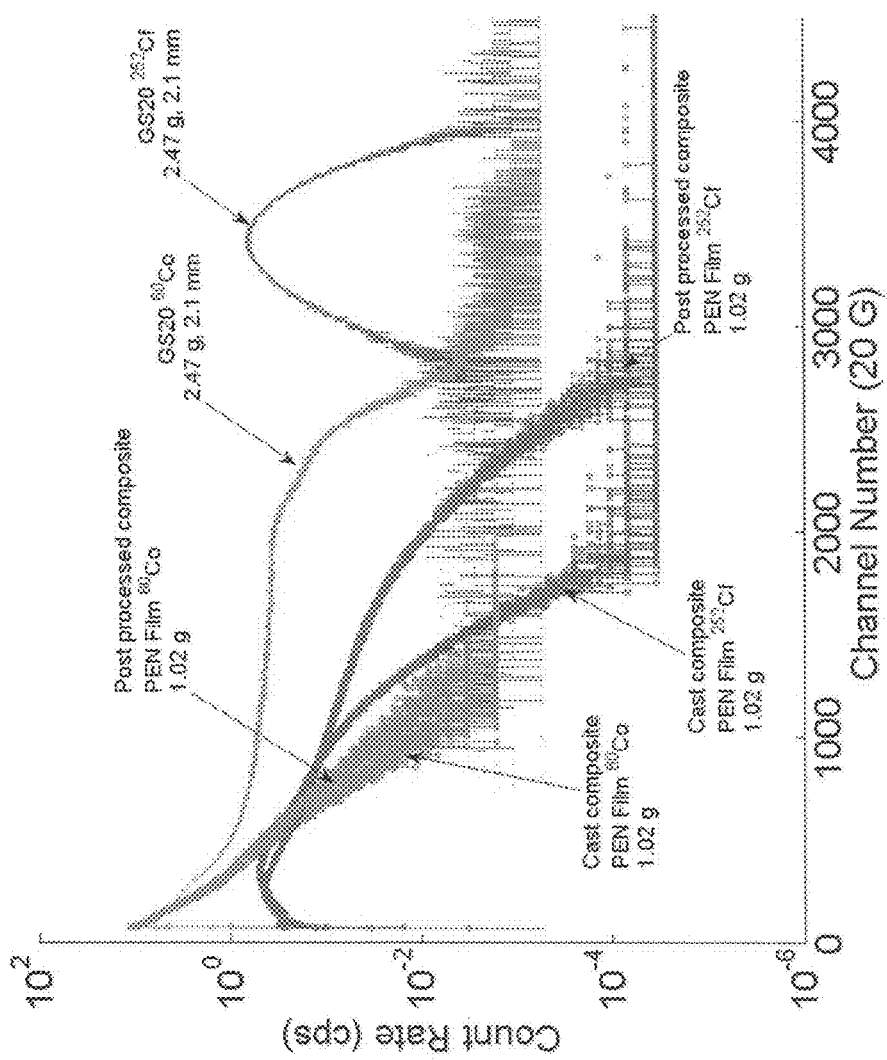
FIG. 8 is a graph showing gamma count rate (red) and net neutron count rate (green) spectra for composite films comprising 70 weight polyethylene naphthalate (PEN), 25 weight % $^6$LiF, and 5 weight % fluor (a mixture of 2,5-diphenyloxazole (PPO) and 1,4-bis-(5-phenyloxazol-2-yl) (POPOP)). Curves are shown for both an unstretched cast composite film (Cast composite PEN Film; total mass 1.02 grams (g), 490 microns (µm) thick) and a thermally annealed cast composite film (Post processed composite PEN film, total mass 1.02 g, 490 µm thick). The gamma count was measured using response to cobalt 60 ($^{60}$Co) and the net neutron count rate was measured using response to californium 252 ($^{252}$Cf). For comparison, the spectra of a commercial lithiated glass scintillator (GS20) which is 2.1 millimeters (mm) thick (i.e., 2,100 microns thick; total mass 2.47 grams (g)) are also shown.

An additional, thicker (490 microns) cast composite film comprising 70 weight % PEN, 25 weight % $^6$LiF nanoparticles, and 5 weight % PPO/POPOP was prepared. The film was cut into two inch diameter samples. One sample was post processed via thermal annealing as described above. Both an unstretched, non-annealed sample (UCF, 490 microns) and the post processed sample (PCF, 490 microns) were characterized for neutron and gamma response. See FIG. 8. See also, Table 9, below. For comparison, results for the commercial lithiated glass scintillator (GS20; 2100 microns thick) are also shown. Both composite samples had a mass of 1.02 g, while the glass scintillator had a mass of 2.47 g.

TABLE 9

Neutron and Gamma Responses of 490 Micron Thick Composite Films.

| Sample | Mass $^6$Li (mg) | Neutron Count Rate (cps) | Count Rate/mg $^6$Li (cps/mg) | Neutron End Point (Channel Number) | Neutron Count Rate above Gamma LLD such that $\xi_{int}$ yn < $10^{-6}$ (Channel Number) |
|---|---|---|---|---|---|
| GS20 | 154.2 | 280 | 2 | 4244 | 2 |
| UCF | 61.2 | 286 | 5 | 1949 | 2 |
| PCF | 61.2 | 280 | 5 | 2873 | 9 |

Example 7

Electrospun Polymer Nanofibers

Polymer composite nanofibers can be prepared as follows. Briefly, a solution of high molecular weight PS ($M_n = 10^6$ as determined by gel permeation chromography) and P2VN ($M_n = 1.2 \times 10^6$) was prepared in anhydrous THF/DMF (4:1 v/v) by mixing the polymer and solvents (3 weight % by volume PS and 2 weight % by volume P2VN) and heating the mixture to 75° C. for 90 minutes until a homogenous solution was obtained. A solution of the high molecular weight PS (3 weight % by volume) was prepared in anhydrous $CHCl_3$/DMF (17:3) by mixing the polymer and solvents and heating the mixture to 75° C. for 90 minutes until a homogenous solution was obtained. To the PS/P2VN solution was added $^6$LiSal (13.5 weight % in polymer) and anthracene (7 weight % in polymer). To the PS solution was added $^6$LiF (20 weight % in polymer) and PPO/POPOP (8 weight % in polymer). The polymer solutions were electrospun using 3 mL and 5 mL syringes, having 16.5 gauge (for the PS solution) and 23 gauge (for the PS/P2VN solution) needles. A metering pump delivered polymer solution through the syringe to the tip of the needle. A direct current high voltage power supply was used to apply voltage (16 kV-18 kV) to the needle, producing a jet toward a grounded collector.

For characterization by energy dispersive X-ray-scanning electron microscopy or scanning electron microscopy, the fibers were coated with gold using a sputter coater. The fibers had diameter size distributions between 200 and 1400 nm. The fiber distribution and average fiber diameter (505 nm) of the $^6$LiF/PS fibers were slightly narrower and smaller than the fiber distribution and average fiber diameter (515 nm) of the $^6$LiSal/PS/P2VN fibers. Without being bound to any one theory, it is believed that an increase in polymer concentration can increase the average nanofiber diameter, while the dielectric properties and surface tension of the solution solvents can influence the phase morphology and fiber dimensions. In one larger diameter fiber, micron size crystals (approximately 3 microns) were observed distributed within the PS fibers.

The excitation-emission behavior of fiber mats of the $^6$LiF/PS and $^6$LiSal/PS/P2VN nanofibers were studied. The $^6$LiF/PS nanofiber mat had an excitation peak at 280 nm and an emission peak at 420 nm with a Stokes shift of 140 nm. The $^6$LiSal/PS/P2VN nanofiber mat had an excitation peak at 313 nm and an emission peak at 432 nm with a Stokes shift of 119 nm. The emission curve of the $^6$LiSal/PS/P2VN nanofiber mat had a single peak, corresponding to the emission of anthracene, indicating efficient intermolecular energy transport.

The samples were tested under irradiation with alpha, beta and gamma sources using a neutron irradiator containing acrylic and cadmium cylinders to obtain a net thermal neutron response as described in Sen et al. (*IEEE Trans. Nucl., Sci.* 58(3), 1386-1393 (2011)). The $^6$LiSal/PS/P2VN nanofiber mat had clear distinction of thermal neutrons. See Young et al. (*Journal of Engineering Materials and Technology*, 134, 010908 (2012). Although the neutron response was not as large as for GS20, the nanofiber mat had a significantly lower loading of $^6$Li, was thinner and had a smaller net weight. Neutrons were not detected for the $^6$LiF/PS fiber mats. Without being bound to any one theory, this is believed to be due to quenching of light and to micron-sized domains scattering light within the samples. The fiber mats did not yield appreciable light response using alpha, beta, or gamma rays. This was expected due to the small amount of neutron absorbing material in the mats.

Example 8

Pulse Shape Discrimination

Figure 10A:
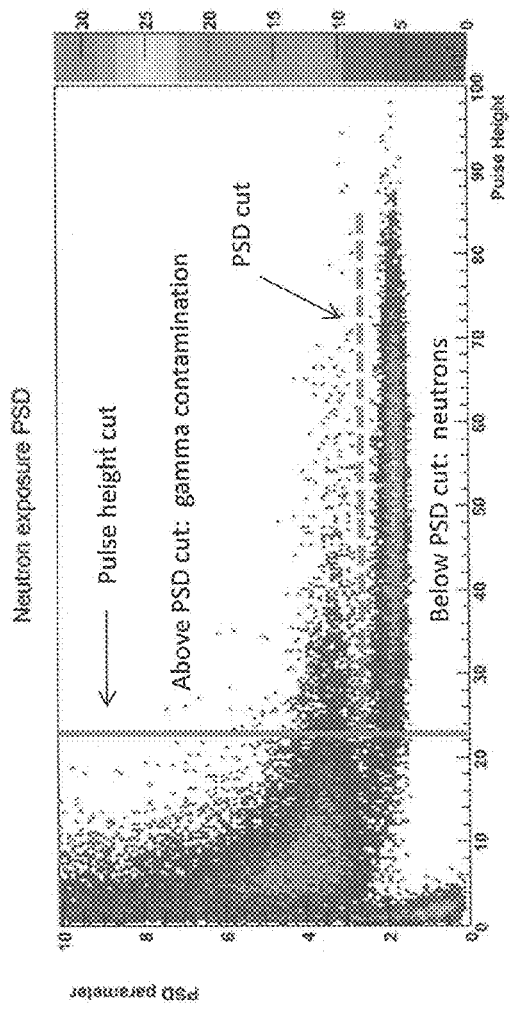
FIG. 10A is a plot of pulse shape discrimination (PSD) parameter versus pulse height sum following exposure of a polymer composite of the presently disclosed subject matter to neutron radiation (from an AmLi source). The vertical line indicates pulse height cut line and the dotted horizontal line indicates the PSD parameter cut line for discriminating between gamma and neutron radiation. Above the PSD cut line and on the right hand side of the pulse height cut line, the data indicates gamma contamination. Below the PSD cut line and on the right hand side of the pulse height cut line, the data indicates neutron radiation. The color bar on the right hand side of the plot indicates the number of counts corresponding to a given value of pulse height and PSD parameter; i.e., it represents the number of pulses observed for each data point. The number of counts increases from blue to red.
Figure 10B:
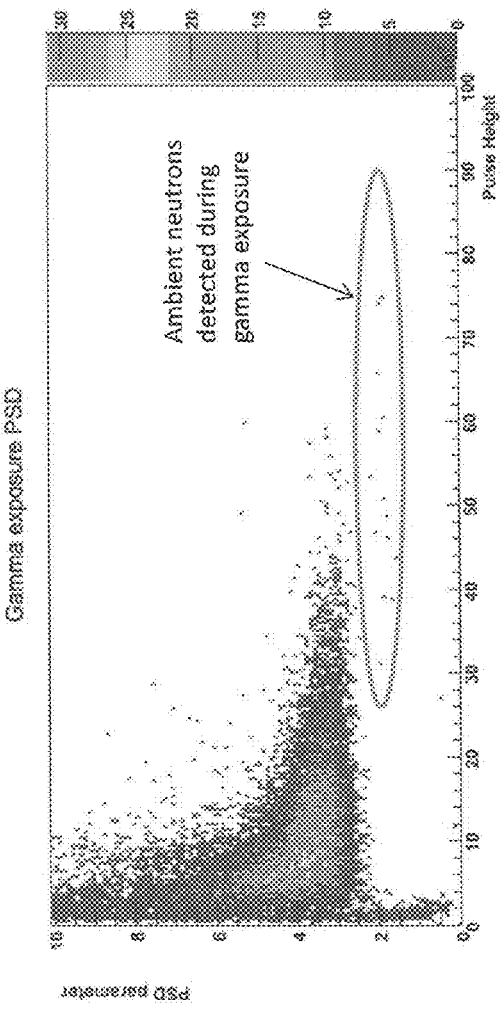
FIG. 10B is a plot of pulse shape discrimination (PSD) parameter versus pulse height sum following exposure of a polymer composite of the presently disclosed subject matter to gamma radiation only (from a Cs-137 source). Ambient neutrons detected during gamma exposure are circled. As for FIG. 10A, the color bar on the right hand side of the plot indicates the number of counts corresponding to a given value of pulse height and PSD parameter, i.e., it represents the number of pulses observed for each data point. The number of counts increases from blue to red.

The pulse shape discrimination (PSD) characteristics of the presently disclosed polymer composites were examined. A sample of a polymer composite film of the presently disclosed subject matter (i.e., a 200 micron thick, 25 mm diameter film of a polymer composite comprising 70 weight % PEN, 25 weight % $^6$LiF particles having a size range of 200 to 400 nm, and 5 weight % PPO/POPOP wavelength shifting fluor) was mounted with optical grease to the photocathode of a Hamamatsu R6233-100 PMT (Hamamatsu Photonics K.K.; Hamamatsu, Japan). The sample was separately exposed to radioactive sources of sufficient strength to overwhelm background radiation rates to permit the separate examination of gamma and neutron related response. Pulse height spectra were calculated and anode pulse shape was examined for PSD properties. A Struck SIS3305 waveform digitizer (5 gigasample-per-second (GSPS), 200 picosecond per sample; Stuck Innovative System GmbH, Hamburg, Germany) was used to collect the pulses resulting from the interaction of composite scintillator film with thermal neutrons or gamma rays. Examination of pulse shape differences for gamma and neutron response in the sample was conducted by comparing statistically averaged waveforms from specific pulse height regions. To avoid "time smearing" effects in the statistical averaging of the waveforms, a few thousand waveforms were averaged together in each region to construct separate gamma-related and neutron-related waveforms. Gamma-related waveforms corresponded to 4,000 to 10,000 in pulse height sum. Neutron-related waveforms corresponded to above 60,000 in the pulse height spectrum. Results are shown in FIG. 9. PSD parameter was calculated as the ratio of prompt to delayed integrated charges as outlined in D'Olympia et al. (*Nuclear Instruments and Methods in Physics Research A* 714, 121-127 (2013)). The PSD parameter was plotted against the pulse height sum as shown in FIGS. 10A and 10B. As indicated in FIGS. 10A and 10B, the use of the PSD parameter increased neutron/gamma discrimination without the need for a pulse height only-based LLD.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting neutron radiation, wherein the method comprises:
    providing a polymer composite wherein said polymer composite comprises a matrix material comprising at least one aromatic polymer or copolymer formed by polymerization of a monomer comprising a covalently attached radical of an aromatic moiety selected from the group consisting of naphthylene, anthracene, fluorene, terphenyl, phenanthrene, pyridine, furan, and thiophene, a neutron capture agent comprising a $^6$Li compound distributed within the matrix material, and an organic or inorganic luminescent fluor distributed within the matrix material;
    disposing the polymer composite in the path of a beam of radiation, wherein the matrix material and the luminescent fluor of the polymer composite emit light when the composite absorbs said radiation; and
    detecting neutron radiation by detecting the light emitted by the composite, wherein the detecting discriminates between neutron and gamma radiation, further wherein said detecting comprises detecting the light emitted by the composite to provide a photodetection signal and processing the photodetection signal using pulse shape discrimination.

2. The method of claim 1, wherein the detecting and/or discrimination between neutron and gamma radiation is free of the use of a low level discriminator (LLD).

3. The method of claim 1, wherein the neutron capture agent comprises $^6$LiF micro- or nanoparticles.

4. The method of claim 1, wherein the organic or inorganic luminescent fluor is selected based on acceptor donor resonance and/or from the group consisting of 2,5-diphenyloxazole (PPO), 1,4-bis-(5-phenyloxazol-2-yl) (POPOP), anthracene, 9,9,9',9',9'',9''-hexakis(octyl)-2,7',2',7''-trifluorene, n-terphenyl, 2-biphenyl-5-phenyl-1,3-oxazole, 2-biphenyl-5($\alpha$-naphthyl)-1,3-oxazole, 2-phenyl-5-(4-biphenylyl)-1,3,4-oxadiazole, 2-(4'-tert-butylphenyl)-5-(4''-biphenylyl)-1,3,4-oxadiazole, n-bis-(o-methylstyryl)-benzene 1,4-di-(5-phenyl-2-oxazolyl)-benzene, conjugated polymeric and oligomeric dyes, metal organic framework dyes, quantum dots, two-photon absorber semiconductor fluors, and mixtures thereof.

5. The method of claim 1, wherein the composite has a ratio of matrix material to neutron capture agent of between about 3:1 by weight and about 1:2 by weight.

6. The method of claim 1, wherein the composite comprises about 5% or less by weight of the organic or inorganic luminescent fluor.

7. The method of claim 1, wherein the composite comprises $^6$Li salicylate or $^6$LiF as a neutron capture agent and poly(2-vinylnaphthalene) (P2VN) as a matrix material.

8. The method of claim 1, wherein the composite comprises $^6$LiF as a neutron capture agent and PEN as a matrix material.

9. The method of claim 1, wherein the polymer composite is in the form of a film.

10. The method of claim 9, wherein the film is prepared by solution casting a solution comprising the matrix material, the neutron capture agent, and the luminescent fluor.

11. The method of claim 9, wherein the film has a thickness of about 500 microns or less.

12. The method of claim 9, wherein the film is a biaxially or uniaxially stretched film.

13. The method of claim 9, wherein the film is thermally annealed.

14. The method of claim 9, wherein the matrix material comprises PEN, the neutron capture agent comprises $^6$LiF micro- or nanoparticles, and the film is a stretched and/or thermally annealed film.

15. The method of claim 9, wherein the film has a neutron count rate per mg of $^6$Li of between about 4 and about 12 counts per second (cps).

16. The method of claim 1, wherein the polymer composite is in the form of a fiber or fiber mat.

17. The method of claim 16, wherein the fiber or fiber mat is prepared from a polymer composite comprising $^6$Li salicylate or $^6$LiF as the neutron capture agent and a blend of poly(2-vinylnapthalene) (P2VN) and polystyrene (PS) as the matrix material.

18. A method for detecting neutron radiation, wherein the method comprises:
providing a polymer composite wherein said polymer composite comprises a matrix material comprising at least one aromatic polymer or copolymer, a neutron capture agent comprising a $^6$Li compound distributed within the matrix material, and an organic or inorganic luminescent fluor distributed within the matrix material, wherein the at least one aromatic polymer or copolymer is selected from the group consisting of an aromatic polyester, an aromatic polyamide, an aromatic polyether, an aromatic polyimide, an aromatic polythioester, an aromatic vinylpolyether, an aromatic vinylpolyester, an aromatic vinylpolyamide, and an aromatic vinylpolythioester;
disposing the polymer composite in the path of a beam of radiation, wherein the matrix material and the luminescent fluor of the polymer composite emit light when the composite absorbs said radiation; and
detecting neutron radiation by detecting the light emitted by the composite, wherein the detecting discriminates between neutron and gamma radiation, further wherein said detecting comprises detecting the light emitted by the composite to provide a photodetection signal and processing the photodetection signal using pulse shape discrimination.

19. The method of claim 1, wherein the matrix material comprises an aromatic polyester.

20. The method of claim 19, wherein the aromatic polyester is selected from the group consisting of polyethylene naphthalate (PEN), polytrimethylene naphthalate (PTN), poly(9H-fluorene-9,9-dimethanol malonate), poly(9H-fluorene-9,9-dimethanol terephthalate), and poly(4,4'-(9-fluorenylidene)-diphenol terephthalate).

21. A method for detecting neutron radiation, wherein the method comprises:
providing a polymer composite wherein said polymer composite comprises a matrix material comprising at least one aromatic polymer or copolymer, a neutron capture agent comprising a $^6$Li compound distributed within the matrix material, and an organic or inorganic luminescent fluor distributed within the matrix material, wherein the at least one aromatic polymer or copolymer comprises an aromatic vinylpolyester, an aromatic vinylpolyamide, or an aromatic vinylpolythioester, wherein said aromatic vinylpolyester, aromatic vinylpolyamide, or aromatic vinylpolythioester comprises a derivatized polyacrylic or polyalkylacrylic acid, wherein acid groups of the polyacrylic or polyalkylacrylic acid are derivatized to form ester, thioester or amide linked side chains, wherein the side chains comprise aromatic groups;
disposing the polymer composite in the path of a beam of radiation, wherein the matrix material and the luminescent fluor of the polymer composite emit light when the composite absorbs said radiation; and
detecting neutron radiation by detecting the light emitted by the composite, wherein the detecting discriminates between neutron and gamma radiation, further wherein said detecting comprises detecting the light emitted by the composite to provide a photodetection signal and processing the photodetection signal using pulse shape discrimination.

22. An apparatus for detecting neutron radiation, wherein the apparatus comprises:
a polymer composite comprising a matrix material comprising at least one aromatic polymer or copolymer formed by polymerization of a monomer comprising a covalently attached radical of an aromatic moiety selected from the group consisting of naphthylene, anthracene, fluorene, terphenyl, phenanthrene, pyridine, furan, and thiophene, a neutron capture agent comprising a $^6$Li compound distributed within the matrix material, and an organic or inorganic luminescent fluor distributed within the matrix material;
a photon detector; and
a processor for performing a discrimination method for processing an output of the photon detector using pulse shape discrimination for differentiating responses of the polymer composite to neutron and gamma radiation.

23. The apparatus of claim 22, wherein the apparatus is free of a low level discriminator (LLD) and/or can discriminate between neutron and gamma radiation without the use of a LLD.

24. The apparatus of claim 22, wherein the processor comprises a waveform digitizer.

25. The apparatus of claim 22, wherein the polymer composite comprises $^6$LiF as the neutron capture agent and PEN as a matrix material.

26. The apparatus of claim 25, wherein the polymer composite is in the form of a film.

27. The apparatus of claim 26, wherein the film is biaxially or uniaxially stretched and/or thermally annealed.

* * * * *